(12) United States Patent
Oikawa

(10) Patent No.: US 8,276,034 B2
(45) Date of Patent: Sep. 25, 2012

(54) INFORMATION PROCESSING APPARATUS, INFORMATION PROCESSING METHOD, AND COMPUTER PROGRAM PRODUCT

(75) Inventor: Masahiko Oikawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 925 days.

(21) Appl. No.: 12/318,245

(22) Filed: Dec. 23, 2008

(65) Prior Publication Data

US 2009/0199060 A1 Aug. 6, 2009

(30) Foreign Application Priority Data

Dec. 27, 2007 (JP) ................................ 2007-337642
Nov. 20, 2008 (JP) ................................ 2008-296530

(51) Int. Cl.
*G08C 25/02* (2006.01)
*H04L 1/18* (2006.01)

(52) U.S. Cl. ...................................................... 714/748
(58) Field of Classification Search ................... 714/748
See application file for complete search history.

(56) References Cited

U.S. PATENT DOCUMENTS

| 5,222,061 | A | * | 6/1993 | Doshi et al. ................... 370/394 |
| 5,684,791 | A | * | 11/1997 | Raychaudhuri et al. ... 370/310.2 |
| 6,693,910 | B2 | * | 2/2004 | Chao .............................. 370/394 |
| 6,728,213 | B1 | * | 4/2004 | Tzeng et al. ................... 370/235 |
| 6,741,554 | B2 | * | 5/2004 | D'Amico et al. .............. 370/225 |
| 7,079,489 | B2 | * | 7/2006 | Massie et al. ................. 370/236 |
| 7,180,896 | B1 | * | 2/2007 | Okumura ....................... 370/394 |
| 7,236,494 | B2 | * | 6/2007 | Mallory ......................... 370/394 |
| 7,319,698 | B2 | * | 1/2008 | Higashigawa et al. ........ 370/394 |
| 7,373,449 | B2 | | 5/2008 | Radulescu et al. |
| 7,391,727 | B2 | * | 6/2008 | Yoon et al. ..................... 370/232 |
| 7,724,749 | B2 | * | 5/2010 | Terry et al. .................. 370/395.4 |
| 7,885,264 | B2 | * | 2/2011 | Tateno et al. .................. 370/394 |
| 2004/0263903 | A1 | | 12/2004 | Oikawa |
| 2005/0094667 | A1 | * | 5/2005 | Dahlman et al. .............. 370/473 |
| 2006/0256794 | A1 | * | 11/2006 | Rezaiifar et al. .............. 370/394 |
| 2007/0064705 | A1 | | 3/2007 | Tateno et al. |

FOREIGN PATENT DOCUMENTS

| JP | 2001-168907 | 6/2001 |
| JP | 2006-502487 | 1/2006 |
| JP | 2007-074429 | 3/2007 |
| JP | 4034323 | 11/2007 |
| WO | WO 2005/027456 | 3/2005 |

OTHER PUBLICATIONS

English language abstract of Japanese Publication No. 2005-333676, published on Dec. 2, 2005.

* cited by examiner

*Primary Examiner* — Joseph D Torres
(74) *Attorney, Agent, or Firm* — Harness, Dickey & Pierce, P.L.C.

(57) ABSTRACT

A receiving unit wirelessly receives a packet communication signal. When receiving a packet included in the packet communication signal is failed, a requesting unit issues a retransmission request for retransmitting the packet. A storing unit stores therein packets included in packet communication signals received before and after issuing the retransmission request. A setting unit sets an order of transferring the packets stored in the storing unit to a control unit in an order of receiving the packets without a fail. A transferring unit transfers the packets stored in the storing unit to the control unit in the order set by the setting unit.

8 Claims, 15 Drawing Sheets

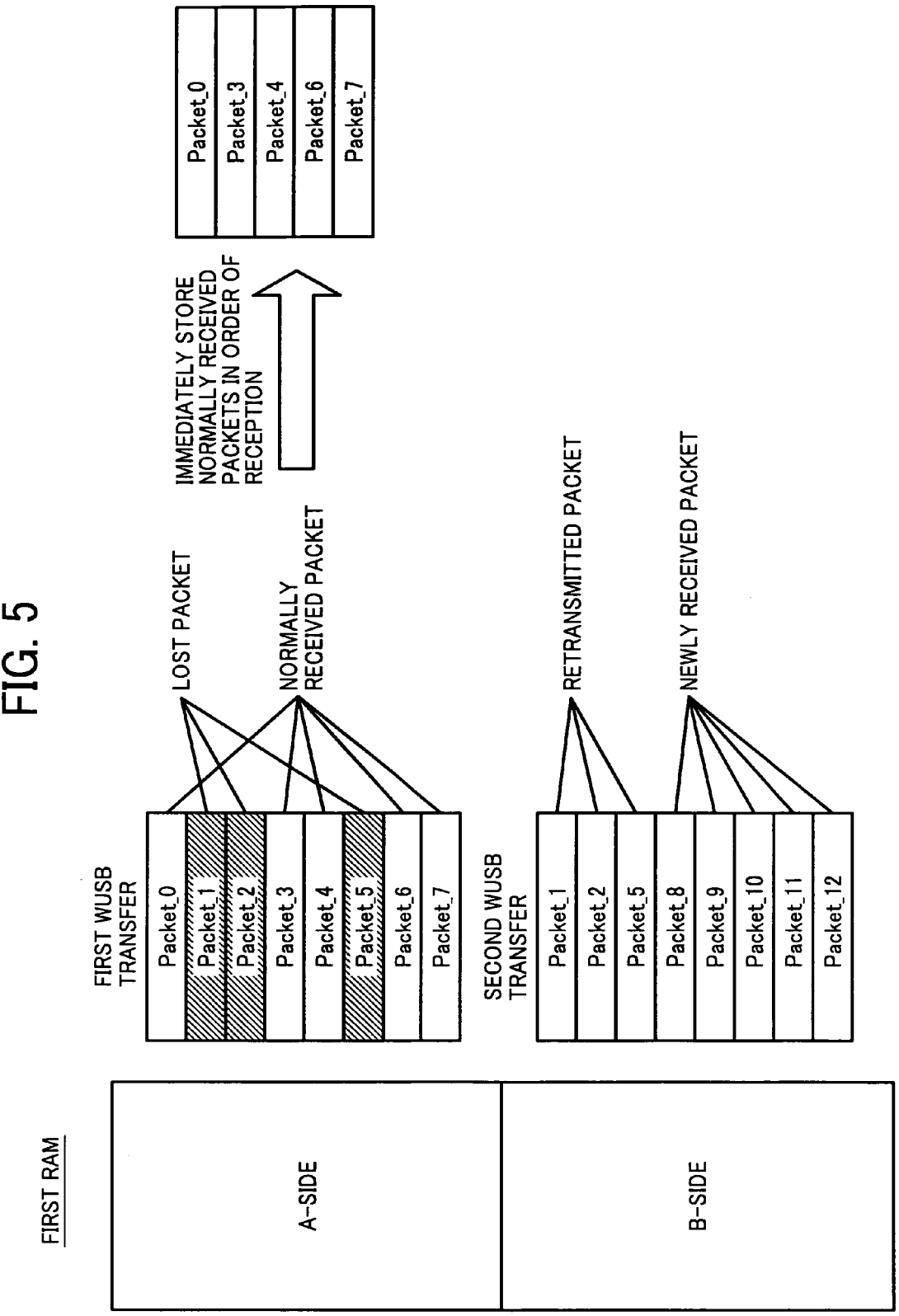

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese priority document 2007-337642 filed in Japan on Dec. 27, 2007 and Japanese priority document 2008-296530 filed in Japan on Nov. 20, 2008.

BACKGROUND OF THE INVENTION

1. Field of the Invention

The present invention relates to a technology for receiving data from outside with a plurality of packets in units of communication.

2. Description of the Related Art

Packet communication is becoming a core technique for exchanging data between an information processing apparatus and an external device in a wireless network environment. Typically, a predetermined number of packets are transmitted in bulk by a single packet transmission (hereinafter, referred to as a "unit of communication" as appropriate). The number of packets to be contained in one unit of communication is determined as a burst length, and each of the packets is assigned with a packet number in the order by which data has been broken into the packets. If some packets contained in one unit of communication have not been received, those packets are retransmitted by next packet transmission. In this situation, there is a problem that the retransmitted packets are stored in a memory in a communication controller in order of reception, that is, an order different from an order of packet number.

If the packets stored in the memory are transferred in the order of reception to a main memory in a main controller, the main controller needs to sort the packets into a correct order. Therefore, loads on a main central processing unit (CPU) of the main controller increases (see FIG. 6).

A conventional technology for reducing processing loads during communication control is disclosed in, for example, Japanese Patent Application Laid-open No. 2007-74429. However, the conventional technology is less effective for resolving problems due to packet sorting.

Specifically, if the packets stored in the memory in the communication controller are sorted into a correct order by transferring the packets in several batches in order of packet number, a plurality of times of transfer is necessary (see FIG. 7). Therefore, transfer efficiency degrades. Furthermore, interrupt processing needs to be performed for every transfer, leading to complicated processing procedures. Therefore, loads on the main CPU of the main controller increases.

The above-mentioned problems due to retransmission of packets may be resolved by providing enhanced hardware such as high-end CPUs or high-capacity memories in information processing apparatuses. However, for some types of information processing apparatuses such as copiers or multifunction peripherals (MFPs), enhancement of hardware leads to increase in size and cost. Therefore, the above technique is not always effective for every type of information processing apparatuses.

SUMMARY OF THE INVENTION

It is an object of the present invention to at least partially solve the problems in the conventional technology.

According to one aspect of the present invention, there is provided an information processing apparatus including a receiving unit that wirelessly receives a packet communication signal including a plurality of packets in units of communication; a requesting unit that, when the receiving unit fails to receive a packet included in the packet communication signal, issues a first retransmission request for retransmitting the packet; a storing unit that stores therein packets included in a first packet communication signal received before the first retransmission request is issued and packets included in a second packet communication signal received after the first retransmission request is issued including a retransmitted packet; a setting unit that sets a first order of transferring the packets stored in the storing unit to a control unit in an order of receiving the packets when the receiving unit receives the packets without a fail; and a transferring unit that transfers the packets stored in the storing unit to the control unit in the first order.

Furthermore, according to another aspect of the present invention, there is provided an information processing method including receiving wirelessly a packet communication signal including a plurality of packets in units of communication; issuing, when a reception of a packet included in the packet communication signal is failed, a first retransmission request for retransmitting the packet; storing packets included in a first packet communication signal received before the first retransmission request is issued and packets included in a second packet communication signal received after the first retransmission request is issued including a retransmitted packet in a storing unit; setting a first order of transferring the packets stored in the storing unit to a control unit in an order of receiving the packets when the packets are received without a fail; and transferring the packets stored in the storing unit to the control unit in the first order.

Moreover, according to still another aspect of the present invention, there is provided a computer program product including a computer-usable medium having computer-readable program codes embodied in the medium that when executed cause a computer to execute receiving wirelessly a packet communication signal including a plurality of packets in units of communication; issuing, when a reception of a packet included in the packet communication signal is failed, a first retransmission request for retransmitting the packet; storing packets included in a first packet communication signal received before the first retransmission request is issued and packets included in a second packet communication signal received after the first retransmission request is issued including a retransmitted packet in a storing unit; setting a first order of transferring the packets stored in the storing unit to a control unit in an order of receiving the packets when the packets are received without a fail; and transferring the packets stored in the storing unit to the control unit in the first order.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining how packets are stored in a first random access memory (RAM) shown in FIG. 2 in the situation where packet retransmission is necessary;

DETAILED DESCRIPTION OF THE PREFERRED EMBODIMENTS

Exemplary embodiments of the present invention are explained in detail below with reference to the accompanying drawings. In the following explanation, a multifunction peripheral (MFP) is employed as an example of an information processing apparatus to which the present invention is applied. It is assumed that the MFP has a copier function implemented by causing a plotter to printing out data input by a scanner, and a printer function implemented by causing the plotter to print out print command data received from external devices via wireless packet communication. However, the present invention is not limited to the MFP, and can be applied to other information processing apparatuses that can process data input from external devices via wireless packet communication and output the processed data.

Figure 1:
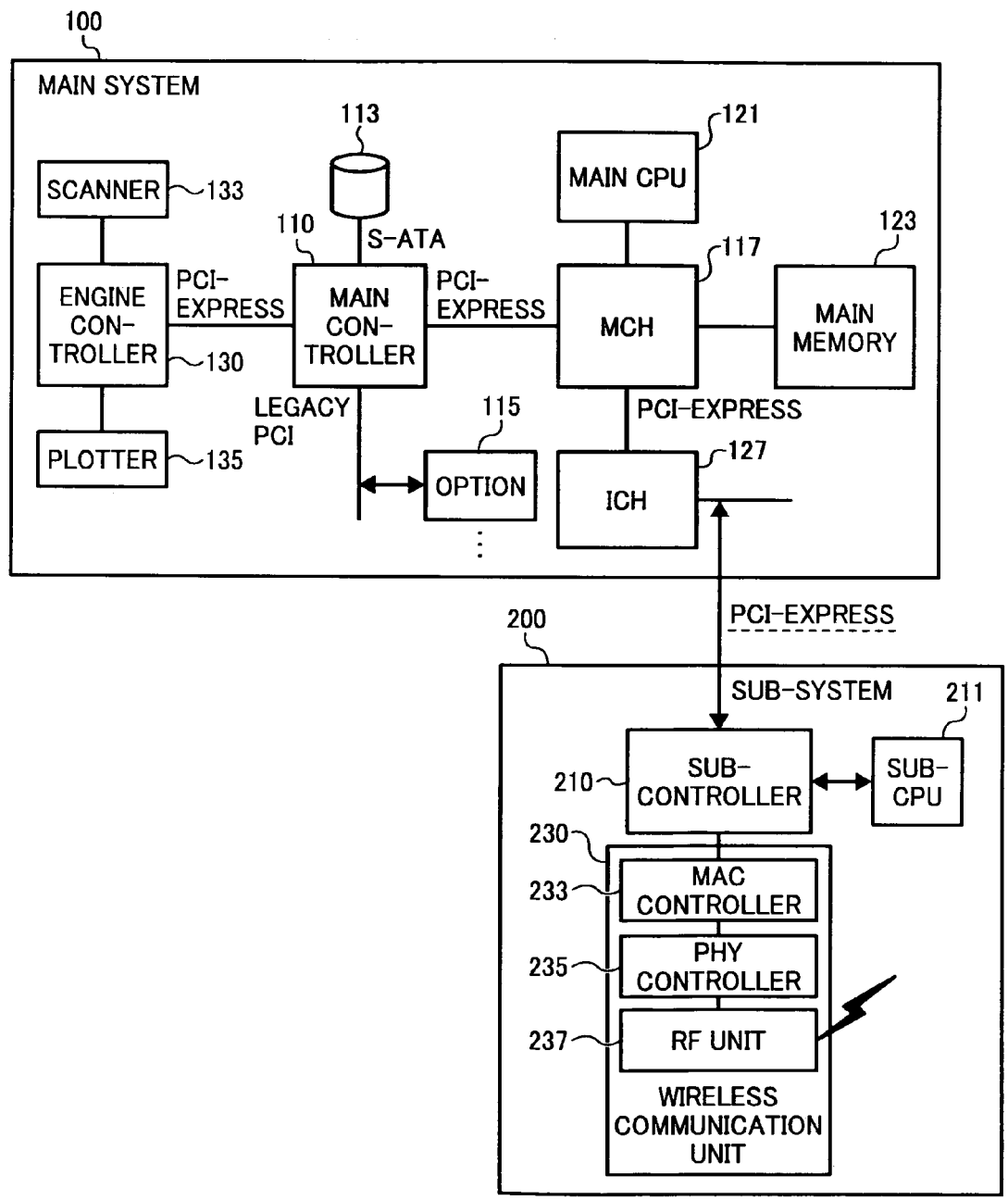
FIG. 1 is a block diagram of a system configuration of a multifunction peripheral (MFP) as an example of an information processing apparatus according to an embodiment of the present invention.

FIG. 1 is a block diagram of a system configuration of the MFP as an information processing apparatus according to an embodiment of the present invention. The MFP is a copier-based MFP and includes a scanner 133 serving as an input device that inputs original images, and a plotter 135 serving as an output device that prints out data. The scanner 133 and the plotter 135 are controlled by an engine controller 130 implemented by an application specific integrated circuit (ASIC). The engine controller 130 is connected to a main controller 110 via a universal high-speed bus such as PCI Express (PCIe).

A main system 100 includes a main central processing unit (CPU) 121. The main CPU 121 controls entire controllers including the main controller 110 implemented by the ASIC, and a sub system 200. Devices controlled by the main CPU 121 are connected to one another via a memory controller hub (MCH) 117 connected to the main CPU 121, and a universal high-speed bus such as PCIe.

The main controller 110 is connected to a local storage unit 113 via S-ATA. The local storage unit 113 stores therein a number of pieces of image data and job history. The main controller 110 is also connected to each of options 115 via legacy PCI such as IEEE 1284 used for transferring data by using a plurality of signal lines in parallel.

A main memory 123 is connected to the main CPU 121 via the MCH 117. The main memory 123 includes a random access memory (RAM) (not shown) that serves as a work memory for storing therein image data and control data during a process, and a read only memory (ROM) (not shown) for storing therein control data, and the like. Computer programs to be executed for performing a process shown in FIGS. 4A and 4B by the main CPU 121 are stored in the ROM in the main memory 123. Because the computer programs are stored in the ROM, the main CPU 121 can perform the process shown in FIGS. 4A and 4B by loading the computer programs from the ROM onto the RAM and executing the loaded computer programs.

The system configuration according to the embodiment includes the sub system 200 configured for use in wireless communication. The sub system 200 is connected to the main system 100 via an input/output controller hub (ICH) 127 with a universal high-speed bus, such as PCIe, separated from one used for connecting the engine controller 130. The sub system 200 includes peripheral devices (not shown) connected thereto and used with a disk storage, a universal serial bus (USB), or a wireless local area network (LAN).

The sub system 200 includes a wireless communication unit 230, a sub controller 210, and a sub CPU 211 that controls the entire system (the sub controller 210 and the wireless communication unit 230). The wireless communication unit 230 includes a radio frequency (RF) unit 237, a physical layer (PHY) controller 235, and a media access control (MAC) controller 233.

The wireless communication unit 230 receives a predetermined number of packets as a unit of communication (hereinafter, referred to as "a packet communication signal" as appropriate) from external devices via a wireless LAN. The number of packets to be contained in a unit of communication of the packet communication signal is determined in advance as a burst length. In the embodiment, the burst length is set to eight. In other words, the wireless communication unit 230 receives eight packets at every reception of the packet communication signal unless packet loss occurs.

In the sub system 200, the sub CPU 211 controls a storage medium (not shown), such as a ROM or a hard disk drive (HDD), connected thereto for storing therein computer programs and control data, similar to the main system 100. The computer programs to be executed for performing the process shown in FIGS. 4A and 4B by the main CPU 121 are stored in the storage medium. Because the computer programs are stored in the storage medium, the main CPU 121 can perform the process shown in FIGS. 4A and 4B by loading the computer programs from the storage medium onto the RAM and executing the loaded computer programs.

The sub controller 210 includes a plurality of memories for storing therein wireless communication data, direct memory access controls (DMAC) for transmitting and receiving data, a third RAM 214 to be accessed by both the main CPU 121 and the sub CPU 211 for information sharing, and bus arbiters that perform bus arbitration among bus masters such as the main CPU 121, the sub CPU 211, and the wireless communication unit 230. The configuration of the sub controller 210 is described below in detail with reference to FIG. 2.

The reason why the sub controller 210 controlled by the sub CPU 211 is provided in the embodiment is to assure real-time wireless communication. Because it is unknown when wireless communication is established, if the sub controller 210 is arranged near the wireless communication unit 230 that enables fast access time, desired operation can be assuredly performed once the wireless communication is started. In the embodiment, distributed control is implemented such that the main CPU 121 controls the DMAC in the sub controller 210 while the sub CPU 211 controls the wireless communication unit 230.

Figure 2:
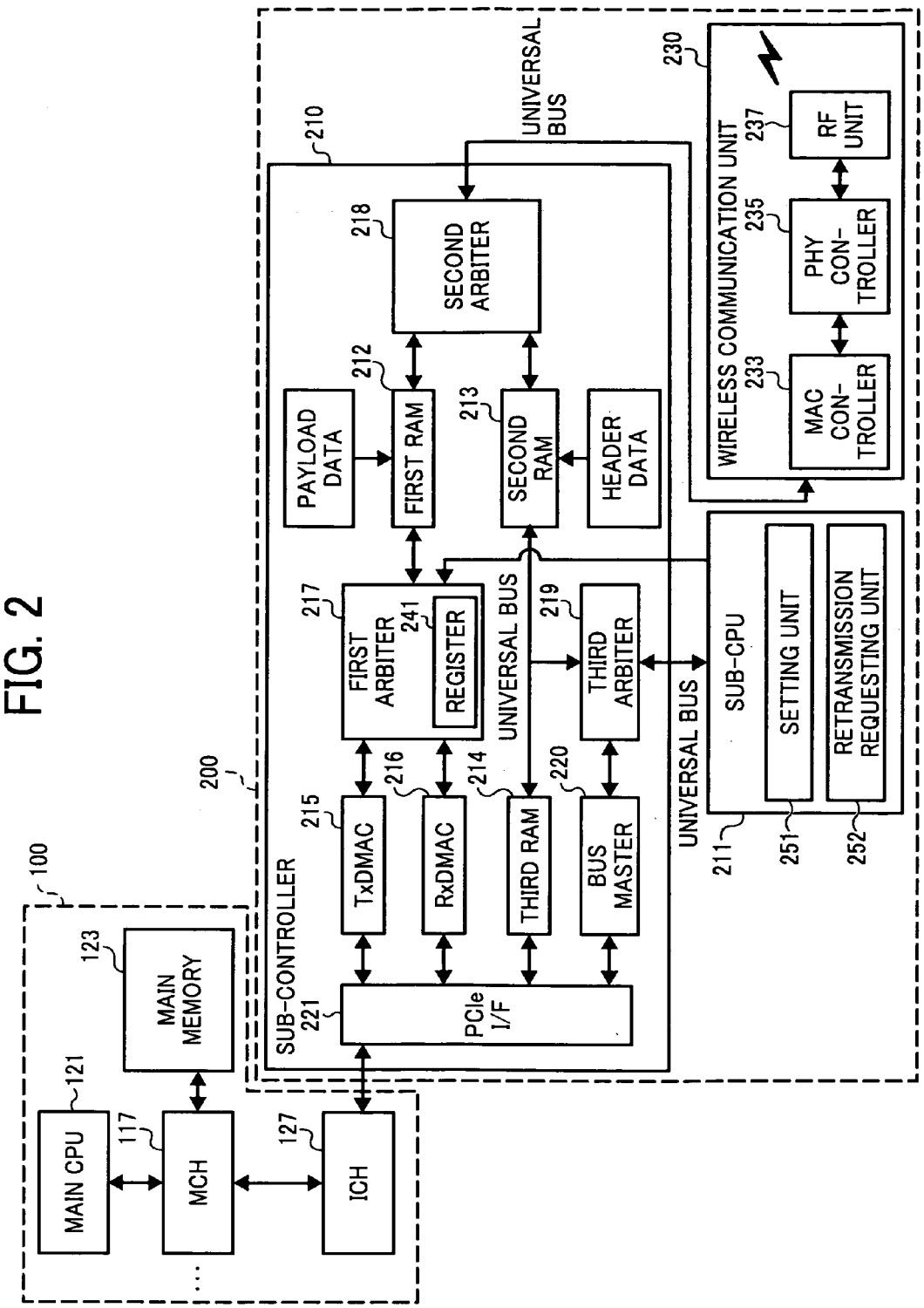
FIG. 2 is a block diagram of a system configuration of a sub controller in a sub system shown in FIG. 1.

FIG. 2 is a block diagram of a system configuration of the sub controller 210 in the sub system 200. The sub system 200 includes the sub controller 210, the sub CPU 211, and the wireless communication unit 230. The sub controller 210 is connected to each of the sub CPU 211 and the wireless communication unit 230 via a universal bus.

The sub controller 210 includes a first RAM 212, a second RAM 213, the third RAM 214, a TxDMAC 215, an RxDMAC 216, a first arbiter 217, a second arbiter 218, a third arbiter 219, a bus master 220, and a PCIe interface (I/F) 221.

The RxDMAC 216 is a DMAC for receiving data and the TxDMAC 215 is a DMAC for transmitting data, and they are built in the sub controller 210. The TxDMAC 215 and the RxDMAC 216 are connected to the main system 100 via a universal high-speed bus such as PCIe, and to the sub CPU 211 via a universal internal bus such as AMBA (registered trademark). Concretely, the TxDMAC 215 and the RxDMAC 216 are connected to the main system 100 via the PCIe I/F 221.

In the system configuration according to the embodiment, each of the main CPU 121, the sub CPU 211, and the wireless communication unit 230 functions as a bus master. Therefore, bus arbiters, that is, the first arbiter 217, the second arbiter 218, and the third arbiter 219, that arbitrate access requests to each of the bus masters are connected to appropriate points.

In the sub controller 210, the first RAM 212 and the second RAM 213 are arranged independent of each other. The second RAM 213 serves as a header buffer for storing therein header data containing control information for each packet (hereinafter, referred to "packet information" as appropriate).

The first RAM 212 serves as a toggle buffer and a payload buffer for storing therein payload data that is valid data contained in each packet. Specifically, the first RAM 212 is configured to have a memory area in which payload data of the same number of packets as in two units of communication can be stored, which will be described in detail later.

The second RAM 213 stores therein header data constituted of a packet size of a received packet, a packet number of the received packet, and a flag indicating whether the packet is normally received. The header data is stored in the second RAM 213 by the wireless communication unit 230. Thus, the sub CPU 211 can check what packet is normally received and what packet is lost by referring to the second RAM 213.

The sub controller 210 includes the third RAM 214 configured to store therein shared information to be used for performing transfer control on packet data by the main system 100 and the sub system 200 such that the third RAM 214 can be accessed by both the main CPU 121 and the sub CPU 211. That is, the main CPU 121 can refer to information stored in the third RAM 214. The third RAM 214 stores therein packet information to be used by the main CPU 121. Thus, the main CPU 121 can check the packet information (e.g., a packet size) by referring to the third RAM 214.

The first arbiter 217 includes a register 241. The register 241 contains a packet address, a packet data size, and a last-packet-data determination flag for identifying a last packet, for each of packets stored in the first RAM 212, in order of transfer of the packets. Accordingly, upon receiving a packet transfer request from the RxDMAC 216, the first arbiter 217 reads the packets in order of transfer originally set for the packets (corresponding to an order of packets to be received by the wireless communication unit 230 without packet loss) by referring to the register 241. The first arbiter 217 then sends the packets read in the above-mentioned order of transfer (sorted packets) to the RxDMAC 216. Subsequently, the RxDMAC 216 transfers the received packets that have been sorted in order of transfer to the main system 100.

Figure 3:
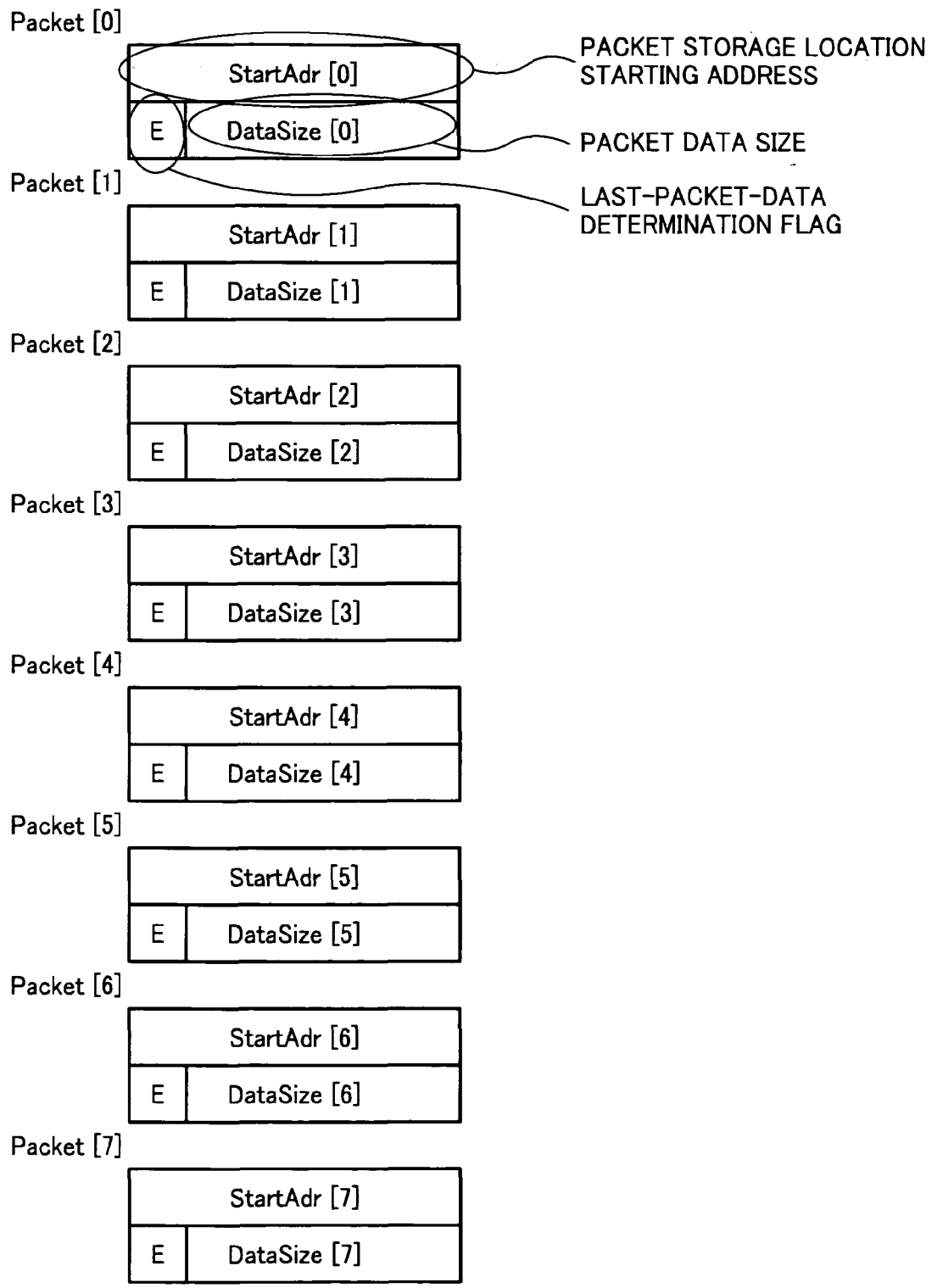
FIG. 3 is a schematic diagram of a configuration of a register in a first arbiter shown in FIG. 2.

FIG. 3 is a schematic diagram of a configuration of the register 241 in the first arbiter 217. The register 241 is configured to store therein packet information of packets of the same number as in one unit of communication (i.e., eight packets) that is a unit for transferring the packets to the main system 100. The reason why the register 241 has the above configuration is because the sub system 200 is configured to transfer eight or fewer packets to the main system 100 by single transfer.

As described above, the register 241 of the first arbiter 217 can store therein information about each of eight packets in order of transfer. The information is stored in the register 241 by a setting unit 251. The last-packet-data determination flag is used for identifying a packet to be transferred at the last to the main system 100. Therefore, what packet is to be transferred at the last can be checked from the last-packet-data determination flag.

Returning to the explanation of FIG. 2, the wireless communication unit 230 receives a packet reception request from external devices via a wireless LAN, and subsequently receives packets in a unit of communication (i.e., eight packets) transmitted from the external devices through a process of permitting transmission of the packets.

The predetermined number of the packets (eight packets in the embodiment) received as a unit of communication are subjected to a process of determining validity of packet data based on checksums by a data checking unit (not shown) in the wireless communication unit 230. When the data checking unit determines that received packet data does not match packet data expected to be received in a normal state, the wireless communication unit 230 discards that packet data. Meanwhile, the wireless communication unit 230 stores normally-received packets in sequence in the first RAM 212 in the sub controller 210 via the MAC controller 233. The wireless communication unit 230 also stores header data (packet information) of each of the normally-received packets in the second RAM 213 that is a header buffer in the sub controller 210.

Upon receiving a last one of the packets in a unit of communication, and storing all the normally-received packets, the wireless communication unit 230 sends an interrupt request due to completion of storing the normally-received packets to the sub CPU 211.

The wireless communication unit 230 performs configuration control on each processing unit at a time of reception of packets. For example, upon receiving packets, the wireless communication unit 230 sends an interrupt request to the sub CPU 211, and then writes header information of each of the received packets onto the second RAM 213. Accordingly, upon receiving an interrupt request from the wireless communication unit 230, the sub CPU 211 can check what packet is lost by referring to the second RAM 213.

The sub CPU 211 implements functions of the setting unit 251 and a retransmission requesting unit 252 in cooperation with a computer program executed by devices in the sub system 200.

The retransmission requesting unit 252 sends, when the wireless communication unit 230 fails to receive a certain packet in the packet communication signal, a request that the lost packet be retransmitted by being contained in a next packet communication signal, to the wireless communication unit 230.

The setting unit 251 sets a packet address, a packet size, and a last-packet-data determination flag for each of packets in order of transfer to the register 241 in the first arbiter 217 by referring to the packet information stored in the second RAM 213. In other words, because the second RAM 213 stores therein the header information of each of the packets and information about whether each of the packets has been normally received or not, the setting unit 251 can identify normally-received packets and lost packets by referring to the information stored in the second RAM 213. Then, the setting unit 251 makes a setting for transferring only the normally-received packets. At this time, the setting unit 251 sets information about each of the packets in order of transfer to the register 241. Therefore, the first arbiter 217 can read the packets in order of transfer by reading information about each of the packets in the order set in the register 241.

Explanation is given below about what setting the setting unit 251 makes upon receiving a retransmission request from the retransmission requesting unit 252. In this case, the first RAM 212 stores therein packets contained in a packet communication signal received by the wireless communication unit 230 before receiving a retransmission request, and packets including a retransmitted packet contained in a packet communication signal received by the wireless communication unit 230 after receiving the retransmission request. The setting unit 251 makes a setting to the register 241 about packet information for each of the packets stored in the first RAM 212 such that the packets are transferred to the main system 100 in order of reception of normally-received packets (an original reception order), which is an order of packets to be received by the wireless communication unit 230 without packet loss. Thus, even when the wireless communication unit 230 fails to receive a certain packet, packets can be transferred to the main system 100 in order of transfer (the original reception order).

If a retransmitted packet is not received even after retransmission is performed in response to the retransmission request, a dummy packet of the same size of that lost retransmitted packet is transferred instead of the lost retransmitted packet. In this case, the setting unit 251 makes a setting such that the dummy packet is to be transferred instead of the lost retransmitted packet in the order corresponding to an order of reception of the lost retransmitted packet, before re-retransmitting the lost retransmitted packet, which will be described in detail later.

The RxDMAC 216 refers to an activation bit of the first arbiter 217. Upon determining that transfer can be performed from the reference, the RxDMAC 216 sends a transfer request for transferring packets to the first arbiter 217. Upon receiving the transfer request, the first arbiter 217 reads the packets in the order set by the setting unit 251, by referring to the register 241. Then, the first arbiter 217 sends the packets in the order (sorted order) set in the register 241 to the RxDMAC 216. Upon receiving the packets, the RxDMAC 216 transfers the packets in order of reception (i.e., in order of transfer) from the first arbiter 217 to the main memory 123.

In the embodiment, when the sub system 200 receives all packets in one unit of communication and to be transferred to the main system 100, the sub CPU 211 sends an interrupt request indicating that transfer can be performed to the main system 100. In other words, when the wireless communication unit 230 of the sub system 200 normally receives eight packets without packet loss, the sub CPU 211 sends an interrupt request indicating that the packets can be transferred to the main system 100 based on assumption that the same number of packets as in one unit of communication are stored in the first RAM 212. On the other hand, when the wireless communication unit 230 of the sub system 200 fails to receive a certain packet, the wireless communication unit 230 attempts to receive the lost packet by next packet transmission. When the same number of packets as in two units of communication are stored in the first RAM 212, the sub CPU 211 sends an interrupt request indicating that the packets can be transferred to the main system 100, which will be described in detail later.

Upon receiving the interrupt request indicating that the packets can be transferred, the main CPU 121 activates the RxDMAC 216, and the RxDMAC 216 continuously sends a packet transfer request to the first arbiter 217. The first arbiter 217 continuously transfers the packets that have been sorted in order of transfer until a last packet identified by the last-packet-data determination flag by referring to the register 241.

In the system configuration shown in FIGS. 1 and 2, the wireless communication unit 230 implements a function of a wireless LAN. The wireless LAN can be implemented by an ultra wide band (UWB) and performs packet communication to transmit and receive data.

In the packet communication, a predetermined number of packets are bundled as a unit of communication. Each of the packets transmitted in a unit of communication is assigned with a packet number in the order by which data is broken into the packets. Meanwhile, the reception side is configured to store the packets in a memory in order of packet number. Thus, the data constituted of the packets can be processed as normal data.

However, in the conventional technology, when a certain packet among packets contained in a unit of communication is not normally received (lost), that packet is retransmitted as one of packets transmitted by next packet transmission. Therefore, the retransmitted packet is out of order of the packet number at the time of reception. Thus, if the retransmitted packet is stored in a memory in order of reception, data constituted of the packets cannot be processed as normal data.

To address the above disadvantage, it is necessary to sort the packets to be stored in a memory. However, as described above, sorting of packets requires more complicated processes, leading to increase of loads on a CPU of a main memory.

According to the embodiment, loads on the main CPU 121 can be reduced due to the sub controller 210, so that an advantage of the embodiment can be attained. A process procedure for sorting packet data received by the wireless communication unit 230 into a correct order through transfer operation performed via the sub controller 210, and storing the sorted packet data in the main memory 123 of the main system 100 is described below.

The transfer operation is performed via the sub controller 210 by both the sub system 200 and the main system 100 when the wireless communication unit 230 receives packets. The transfer operation is implemented by executing corresponding computer programs by the sub CPU 211 that controls the sub system 200 and the main CPU 121 that controls the main system 100.

Figure 4A:
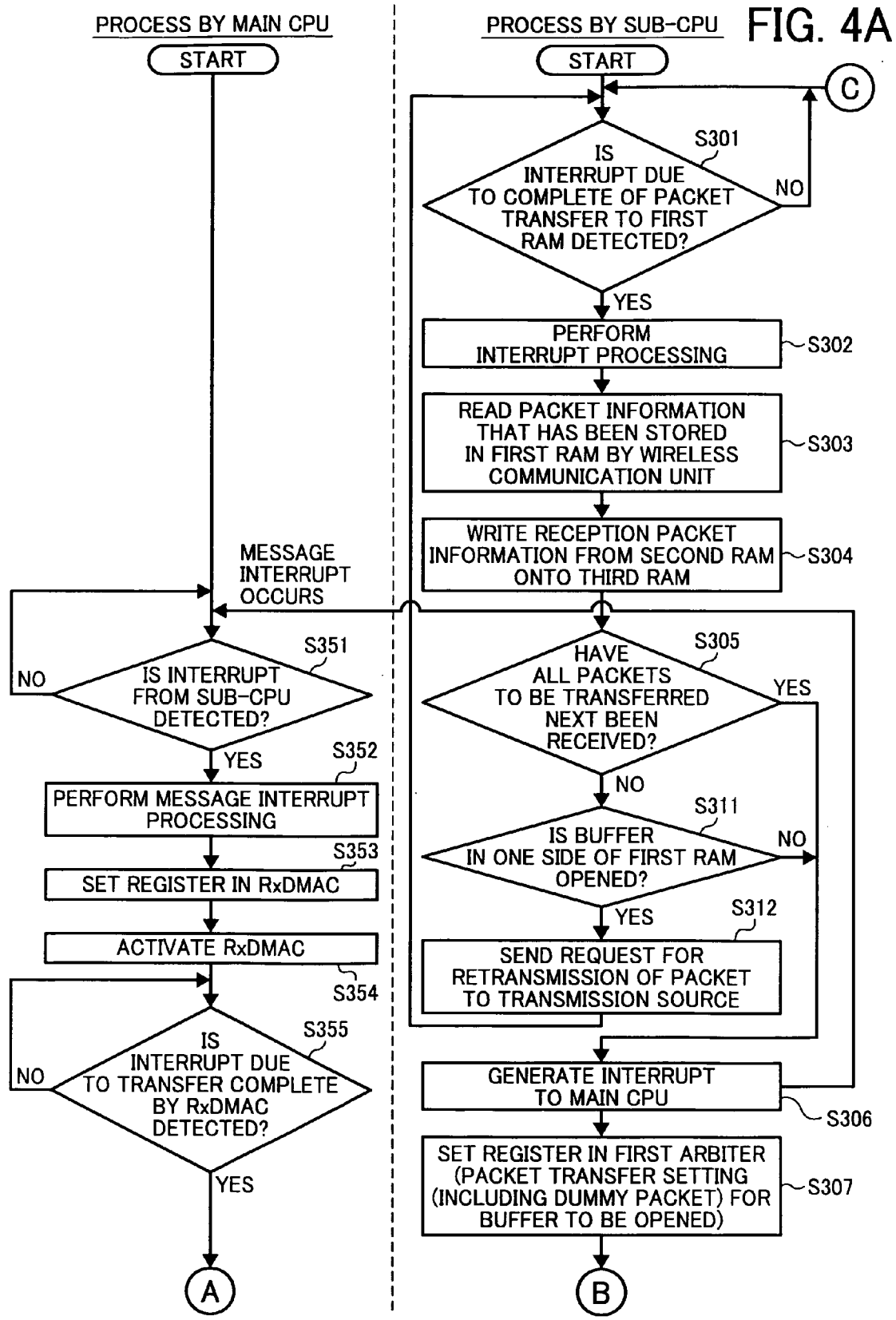
FIGS. 4A and 4B are a flowchart of a transfer process for transferring received packet data to a memory in a main system shown in FIG. 1.
Figure 4B:
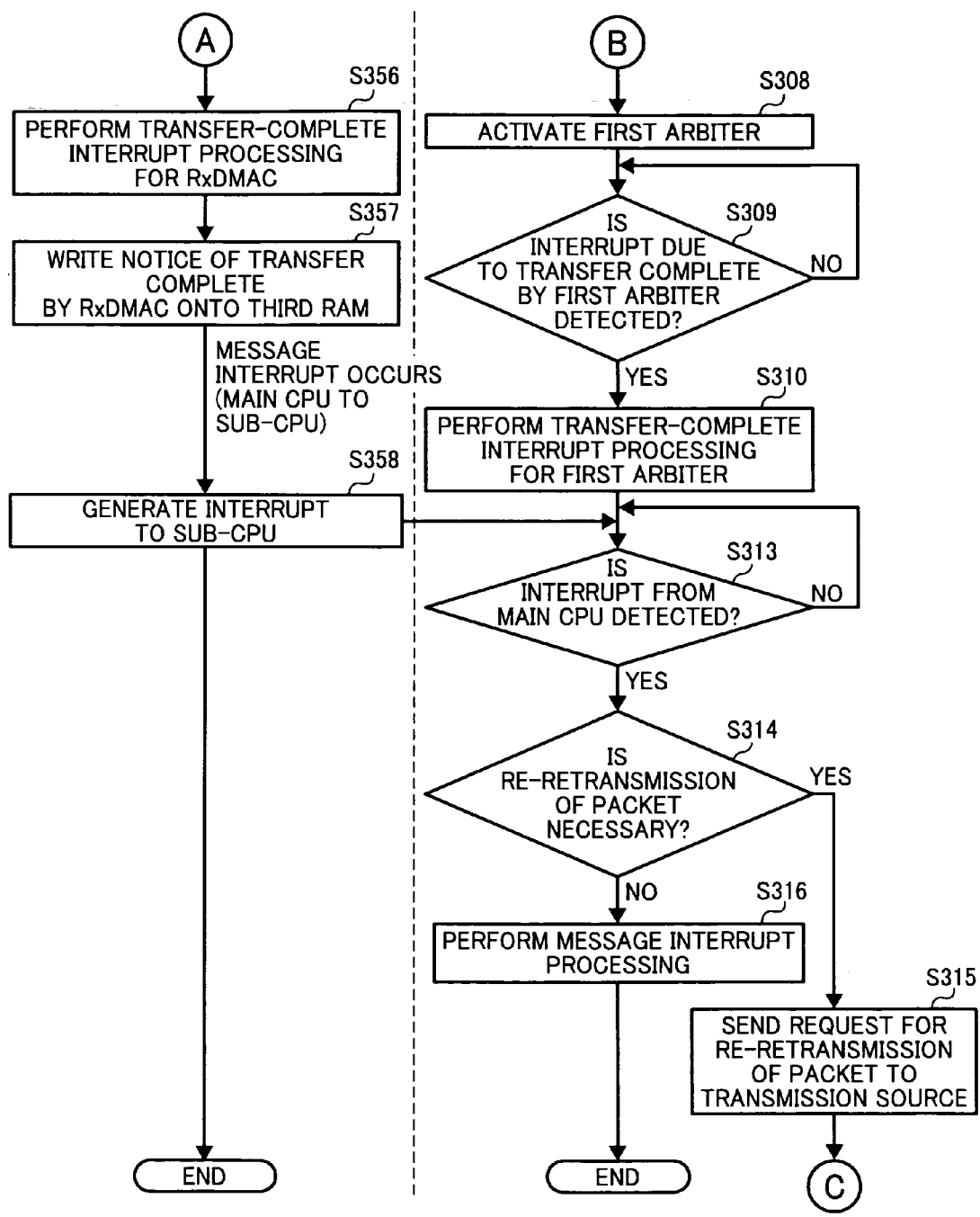

FIGS. 4A and 4B are a flowchart of a transfer process for transferring received packet data to the main memory 123 in the main system 100. The transfer process performed on packet data is described in detail below. The process procedure shown in FIGS. 4A and 4B include a process performed when all packets are normally received, a process performed when packet loss occurs, and a process performed when a retransmitted packet is not received.

It is assumed that the wireless communication unit 230 has received packets before performing the transfer process in the flowchart of FIGS. 4A and 4B. The transfer process can be started in the following situations. One situation is when the wireless communication unit 230 completes reception of a last packet in one unit of communication, the received packets are stored in the first RAM 212, and an interrupt request due to completion of storing the received packets in the first RAM 212 is sent to the sub CPU 211. Another situation is when a certain packet is not stored in the first RAM 212, that packet is retransmitted with packets in a next unit of communication due to a retransmission request and stored in the first RAM 212, whereby both sides of the first RAM 212 are filled with the packets, the same number of packets as in one unit of communication are transferred in order of transfer, and one side of the first RAM 212 is opened. Still another situation is when a re-retransmitted packet is transferred and the both sides of the first RAM 212 are filled with the packets. A process procedure for re-retransmitting a packet is described in explanation of the flowchart of FIGS. 4A and 4B. Explanation about a side of the first RAM 212 will be given later.

The sub CPU 211 determines whether an interrupt request sent from the wireless communication unit 230 due to completion of storing packets is detected (Step S301). Upon determining that the interrupt request is not detected (NO at Step S301), the sub CPU 211 waits for detection of the interrupt request.

Upon determining that the interrupt request is detected (YES at Step S301), the sub CPU 211 performs interrupt processing (Step S302). When an interrupt is issued to the sub CPU 211 during the interrupt processing at Step S302, the sub CPU 211 determines a type of the interrupt.

When a certain packet among packets transmitted in a unit of communication is not normally received, the wireless communication unit 230 sends an interrupt request as a reception error interrupt indicating that the packets are not normally received to the sub CPU 211.

The sub CPU 211 reads header information (packet information) of each of the packets that has been stored in the first RAM 212 by the wireless communication unit 230, from the second RAM 213 (Step S303). The header information to be read is the packet information stored as information about each of the packets that have been normally received by the wireless communication unit 230.

The sub CPU 211 writes the packet information read from the second RAM 213 onto the third RAM 214 so that the packet information can be shared (Step S304). Accordingly, the main CPU 121 and the sub CPU 211 can access the packet information.

A situation in which the wireless communication unit 230 has not normally received a certain packet and a retransmission process is resultantly performed on that packet is described below. FIG. 5 is a schematic diagram for explaining how packets are stored in the first RAM 212 when some packets are not normally received.

In the example shown in FIG. 5, packets of the same number as in two units of communication and including retransmitted packets are stored in the first RAM 212. An upper side of the memory area of the first RAM 212 is referred to as an A-side, and a lower side of the memory area is referred to as a B-side, for convenience of explanation. It is assumed that each of the A-side and the B-side has a memory area capable of storing therein the same number of packets as in one unit of communication, that is, eight packets.

In the example shown in FIG. 5, it is assumed that Packet_1, Packet_2, and Packet_5 (packets indicated by hatching in FIG. 5) have not been received by the first packet transmission, that is, these packets are lost.

When the above three packets are not received by the first packet transmission, the wireless communication unit 230 stores normally-received packets, that is, Packet_0, Packet_3, Packet_4, Packet_6, and Packet_7, in that order in the A-side of the first RAM 212.

By the second packet transmission, Packet_1, Packet_2, and Packet_5 are primary retransmitted due to a retransmission request sent from the retransmission requesting unit 252 of the sub CPU 211. Then, Packet_8 subsequent to the packets that have been normally received by the first packet transmission and packets subsequent to Packet_8 are newly transmitted. If all the packets transmitted by the second packet transmission are normally received, the wireless communication unit 230 stores Packet_1, Packet_2, Packet_5, and Packet_8 to Packet_12 in that order in the B-side of the first RAM 212.

In the example shown in FIG. 5, Packet_0, Packet_3, Packet_4, Packet_6, Packet_7, Packet_1, Packet_2, Packet_5, and Packet_8 to Packet_12 are stored in the first RAM 212 in that order. When the sub system 200 transfers the packets in the current order to the main memory 123 of the main system 100 and the packets are stored in that order, the main system 100 cannot handle the data constituted of the packets as normal data.

To address the above problem, it is necessary to sort the packets to be stored in the memory. In the conventional technology, the following methods have been employed.

Figure 6:
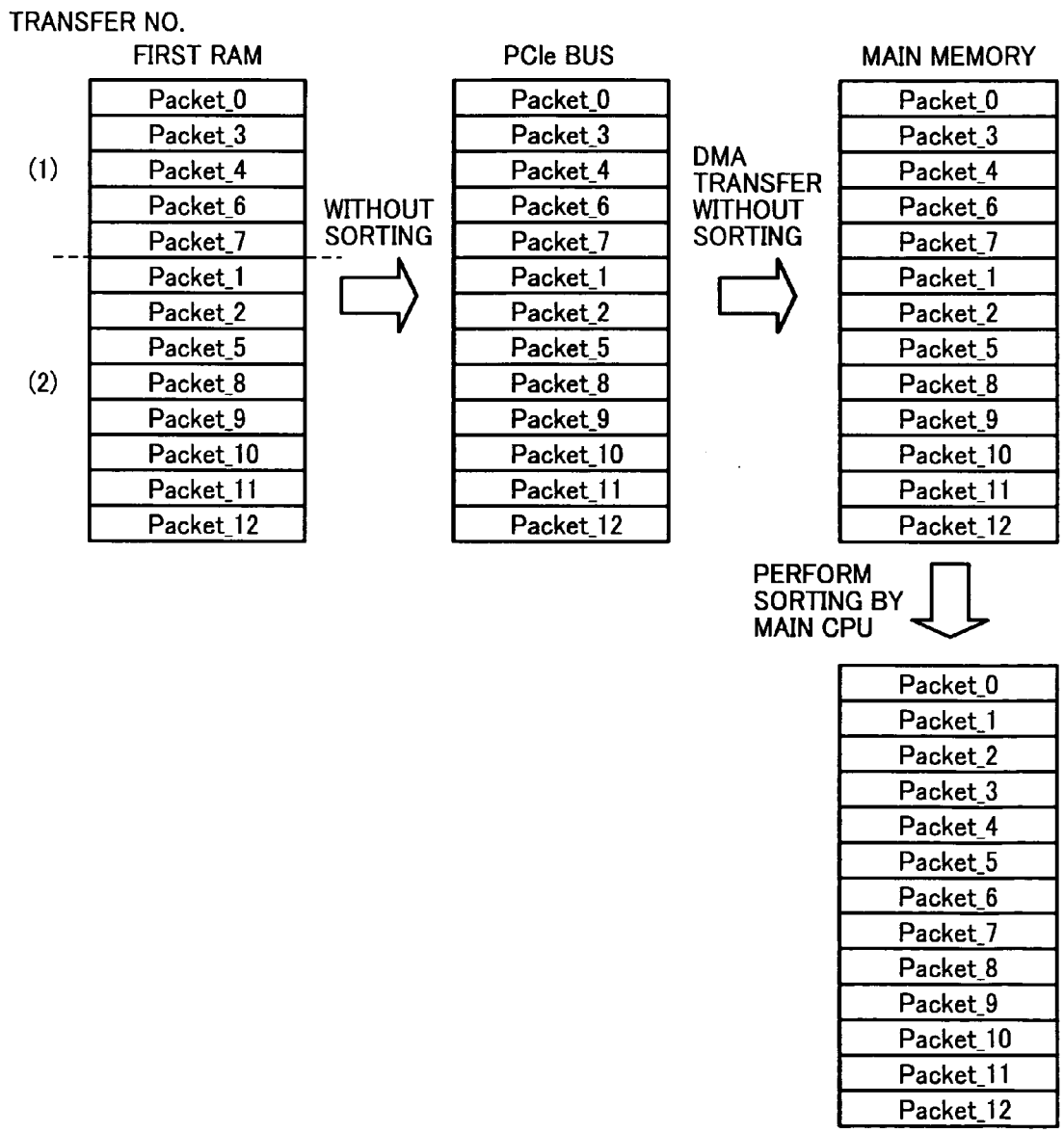
FIG. 6 is a schematic diagram for explaining an example how packets stored in the first RAM are sorted by using the conventional technique.

FIG. 6 is a schematic diagram for explaining an example how packets are sorted by using the conventional technique. In this example, packets are stored in the first RAM 212 in an incorrect order due to packet retransmission, and the packets are stored in the main memory 123 of the main system 100 by DMA transfer via the PCIe bus in the current order without sorting. Then, the main CPU 121 sorts the packets stored in the main memory 123 into a correct order.

The above method is disadvantageous in that loads on the main CPU 121 increases.

Figure 7:
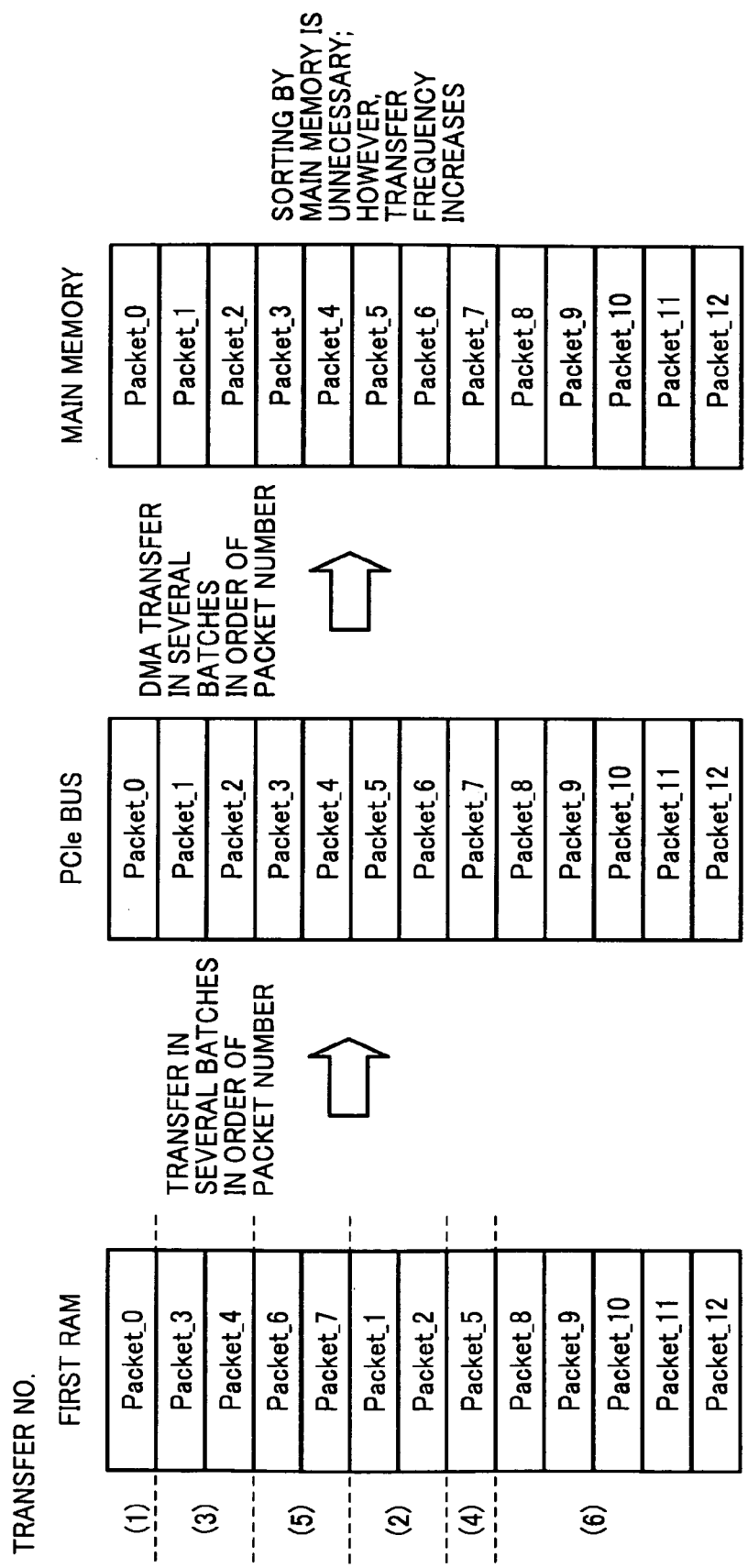
FIG. 7 is a schematic diagram for explaining another example how packets stored in the first RAM are sorted by using the conventional technique.

FIG. 7 is a schematic diagram for explaining another example how packets are sorted by using the conventional technique. In this example, packets stored in the first RAM 212 in an incorrect order due to packet retransmission are grouped into a unit constituted of packets of successive packet numbers. Specifically, the packets are grouped into six transfer units of "Packet_0", "Packet_3 and Packet_4", "Packet_6 and Packet_7", "Packet_1 and Packet_2", "Packet_5", and "Packet_8 to Packet_12", and each unit is transferred to the main memory 123 of the main system 100 by DMA transfer via a PCIe bus. In this method, by selecting an order of transfer of each transfer unit, the resultant order of packets stored in the main memory 123 can be a correct order. Therefore, loads on the main CPU 121 can be reduced. However, a transfer efficiency is degraded because a plurality of times of transfer is necessary. Furthermore, process procedures become complicated because interrupt occurs every time each transfer unit is transferred.

Figure 8:
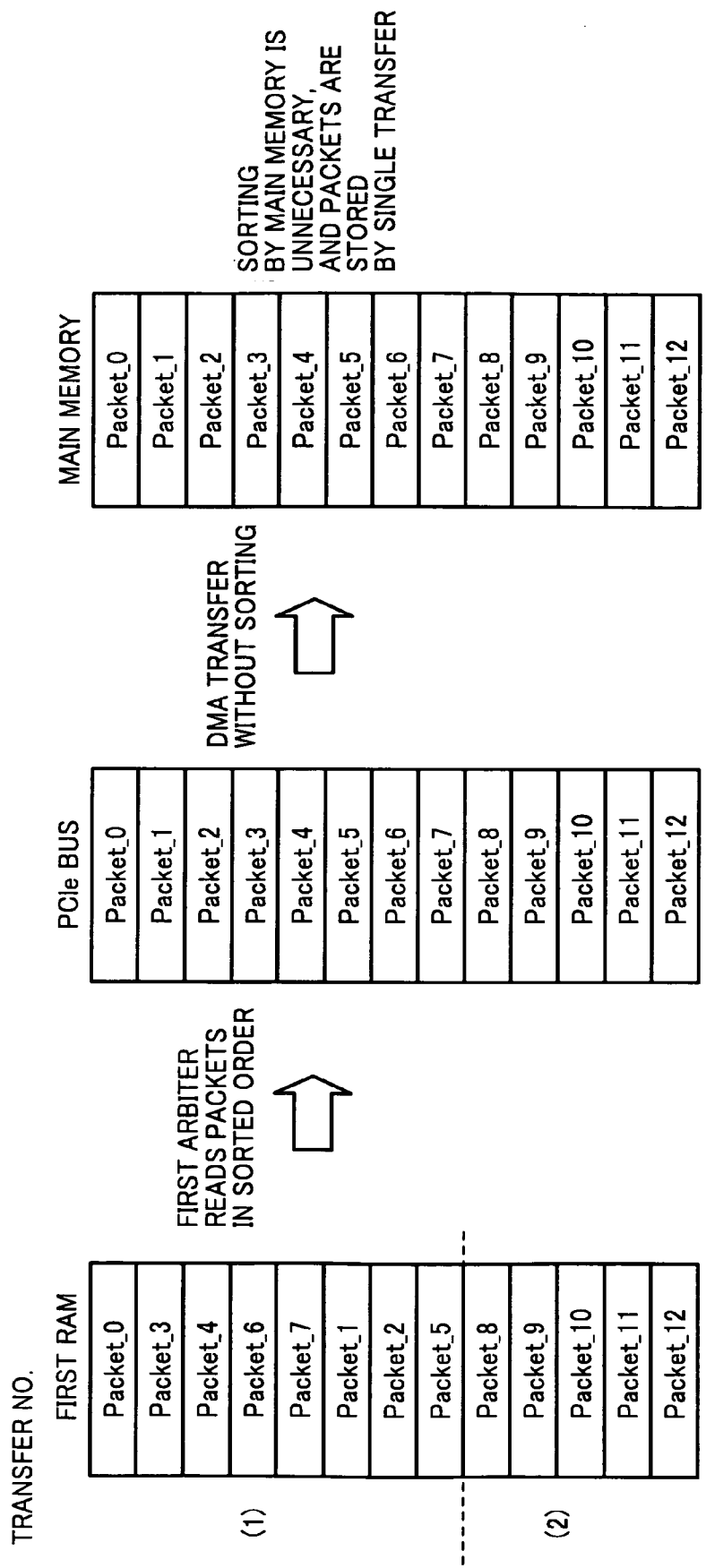
FIG. 8 is a schematic diagram for explaining an example how packets stored in the first RAM are sorted according to the embodiment.

FIG. 8 is a schematic diagram for explaining an example how packets are sorted according to the embodiment. The setting unit 251 of the sub controller 210 sets a condition, as a transfer condition, for each packet data received by the wireless communication unit 230 such that the packets are stored in the main memory 123 of the main system 100, which is a transfer destination, in an original order of transfer. Due to the set transfer condition, the first arbiter 217 reads the packets in the original order of transfer, so that the read packets are stored in that order in the first RAM 212 and then transferred to the main memory 123. As a result, it is possible to realize the transfer operation in which the packets are sorted into the correct order when the packets are stored in the main memory 123.

The transfer operation is described in detail below with reference to FIG. 8, and in connection with the configuration of the sub controller 210 (see FIG. 2).

Assuming that the packets are not sorted into the correct order in the first RAM 212, the setting unit 251 of the sub CPU 211 sets a packet address and the like for each packet in the register 241 of the first arbiter 217. Accordingly, the first arbiter 217 reads the packets in the original order of transfer. The first arbiter 217 operates in response to a transfer request from the RxDMAC 216 so that the transfer operation is performed such that the packets are stored in the correct order in the main memory 123 of the main system 100 by DMA transfer via the PCIe bus (see packets in "PCIe bus" and "main memory" of FIG. 8).

What packet information is to be written in the register 241 of the first arbiter 217 when the packets are stored in the first RAM 212 as shown in FIG. 5 is described below with reference to FIG. 3.

Assuming that the RxDMAC 216 sends Packet_0 to Packet_7 in that order to the main memory 123 via the first arbiter 217, the received packets are stored in the first RAM 212 in the manner as shown in FIG. 5. In this case, the setting unit 251 writes information to the register 241 by the following procedure.

The RxDMAC 216 transfers Packet_0 at the first. Therefore, the setting unit 251 writes a starting address of Packet_0 stored in the A-side of the first RAM 212 (address of the first RAM 212) into StartAdr[0] that is an address register for transferring the first packet in a column of Packet[0] shown in FIG. 3. The setting unit 251 also writes a data size of a packet corresponding to valid data of Packet_0 into DataSize[0] that is a data size register of Packet_0 for transferring the first packet.

Similarly, the RxDMAC 216 transfers Packet_1 at the second. The setting unit 251 writes a starting address of Packet_1 stored in the B-side of the first RAM 212 (see FIG. 5) in StartAdr[1], and a data size of a packet corresponding to valid data of Packet_1 in DataSize[1].

The setting unit 251 repeats the same process of writing information in each register for each of packets until Packet_7.

Because the setting unit 251 sets the registers for each of the packets, the first arbiter 217 reads the packet information (transfer source address and data size) of each of the packets in order of packet number from the register 241, and then reads the packets stored in a location of the first RAM 212 based on the read transfer source address.

Thus, the received packets can be read in order of packet number. Because the sub system 200 is configured as described above, even when the received packets are not stored in order of packet number, the first arbiter 217 can sort the packets in order of packet number and send the sorted data to the RxDMAC 216.

Returning to the explanation of FIGS. 4A and 4B, a process after Step S304 is described below. At Step S304, the wireless communication unit 230 stores the received packets in the first RAM 212 and the header information in the third RAM 214. At this state, it is ready to transfer the same number of packets as in one unit of communication to the main memory 123, regardless of whether all the packets are normally received by single packet transmission or the packets are received by transmitting the packets twice because of retransmission of some lost packets.

The sub CPU 211 determines whether all the packets to be transferred next in the original order of transfer to the main system 100 are received and stored in the first RAM 212 by referring to the second RAM 213 (Step S305). It is assumed that the packets to be transferred next are either packets sorted into the original order of transfer and of the same number as in one unit of communication (eight packets), or re-retransmitted packets. The situation where the same number of packets as in one unit of communication (eight packets) are received can occur either when all packets are received and stored in one side of the first RAM 212 by single packet transmission without packet loss, or when packets are transmitted twice and stored in both sides of the first RAM 212 because of occurrence of packet loss and resultant retransmission of the packet loss.

When it is determined that the packets to be transferred next and of the same number as in one unit of communication are received (YES at Step S305), process control proceeds to Step S306. A process performed when the packets to be transferred next are received is explained below. A process performed when the packets to be transferred next are not received and retransmission is performed by a retransmission request will be explained later.

Upon determining that eight packets are received (YES at Step S305), the sub CPU 211 generates a message interrupt request for requesting the main CPU 121 to take the received packets, by using an interrupt controller (not shown) in the sub controller 210 (Step S306). The generated interrupt request is sent to the main CPU 121. Then, the main CPU 121 starts sending a transfer request.

The setting unit 251 of the sub CPU 211 sets the register 241 in the first arbiter 217 (see the above example described in connection with FIG. 3) in order of packet number by referring to the second RAM 213 (Step S307). It is assumed that the second RAM 213 stores therein data control information received in advance from the wireless communication unit 230, that is, control information to be used for transferring data of packets that have been normally received by the wireless communication unit 230 to the first RAM 212.

After the setting unit 251 sets a transfer source address, a data size, and a last-packet-data determination flag for each of the packets to the register 241 in the first arbiter 217, the sub CPU 211 activates the first arbiter 217 by activating a transfer start trigger (not shown) in the first arbiter 217 (Step S308). Subsequently, the main CPU 121 sends a transfer request to the RxDMAC 216. The RxDMAC 216 calls the first arbiter 217 and transfers the packets. A process performed by the main CPU 121 is described in detail below.

The main CPU 121 determines whether the interrupt request generated by the sub CPU 211 at Step S306 is detected (Step S351). Upon determining that the interrupt request is not detected (NO at Step S351), the main CPU 121 waits for the detection.

Upon determining that the interrupt request is detected (YES at Step S351), the main CPU 121 performs interrupt processing based on the request content indicated by the message (interrupt request) (Step S352). In the interrupt processing, the main CPU 121 reads data control information (the packet information) stored in the third RAM 214 in the sub controller 210. In other words, because the control information (the packet information) of each of the received packets is stored in the third RAM 214 at Step S304, the main CPU 121 reads that information.

The main CPU 121 makes a setting necessary for performing transfer control to a register (not shown) in the RxDMAC 216 based on the read control information (Step S353). The setting is made for transferring the packets stored in the first RAM 212 to the main memory 123 via the first arbiter 217. For example, a data size obtained from the control information from the third RAM 214 for each of the packets to be stored in the main memory 123 is used for the setting.

Upon completing the setting to the register in the RxDMAC 216, the main CPU 121 activates the RxDMAC 216 (Step S354).

When the sub CPU 211 activates the RxDMAC 216, the first arbiter 217 transfers the packets in the order set in the register 241 in the first arbiter 217 at Step S307 to the RxDMAC 216. The RxDMAC 216 stores the received packet in order of transfer in the main memory 123.

Meanwhile, in the process performed by the sub CPU 211, when the process of transferring the packets by the first arbiter 217 is completed, an interrupt controller (not shown) sends a transfer complete interrupt due to transfer complete by the first arbiter 217, to the sub CPU 211. The sub CPU 211 determines whether the transfer complete interrupt is detected (Step S309). Upon determining that the transfer complete interrupt is not detected (NO at Step S309), the sub CPU 211 waits for detection of the transfer complete interrupt.

Upon determining that the transfer complete interrupt is detected (YES at Step S309), the sub CPU 211 performs interrupt processing based on the transfer complete interrupt (Step S310). Then, the sub CPU 211 determines whether an interrupt due to completion of storing the received packets in the main memory 123 (transfer complete) is sent from the main CPU 121 (Step S313). Upon determining that the interrupt is not detected (NO at Step S313), the sub CPU 211 waits for the interrupt from the main CPU 121.

Meanwhile, in the process performed by the main CPU 121, when the received packets are stored in the main memory 123, the RxDMAC 216 generates a transfer complete interrupt. The main CPU 121 attempts to detect the transfer complete interrupt (Step S355). When the transfer complete interrupt is not detected (NO at Step S355), the main CPU 121 waits for the detection of the transfer complete interrupt.

Upon detecting the transfer complete interrupt (YES at Step S355), the main CPU 121 performs transfer-complete interrupt processing (Step S356).

Upon completing the interrupt processing, the main CPU 121 writes information indicating that the RxDMAC 216 has completed the transfer of the packets onto the third RAM 214 in the sub controller 210 (Step S357). Then, the main CPU 121 generates and sends a message interrupt request indicating the transfer complete by the RxDMAC 216 to the sub CPU 211 (Step S358).

At this time, the sub CPU 211 is waiting for the message interrupt request indicating the transfer complete, and attempts to detect the message interrupt request sent from the main CPU 121 (Step S313).

Upon detecting the message interrupt request (YES at Step S313), the sub CPU 211 determines whether re-retransmission of packets is necessary (Step S314). A process performed when re-retransmission of packets is necessary due to a re-retransmission request (YES at Step S314) will be described later. A situation where re-retransmission of packets is necessary occurs when a dummy packet is transferred with real packets to the main CPU 121. In other words, a real packet as a replacement of the dummy packet needs to be re-retransmitted.

Upon determining that re-retransmission of packets is not necessary (NO at Step S314), the sub CPU 211 performs interrupt processing based on the message interrupt request (Step S316), and process control ends.

In this manner, when the RxDMAC 216 transfers a plurality of packets to the main memory 123, a message interrupt indicating transfer complete is sent every time a series of transfer is finished. Thus, unnecessary processes can be reduced, and thereby, processing efficiency can be enhanced.

Upon determining that the packets to be transferred next in the original order of transfer to the main system 100 are not stored in the first RAM 212 by referring to the second RAM 213 (NO at Step S305), the sub CPU 211 determines whether one side of the first RAM 212 is opened (Step S311). A situation where the packets to be transferred next are not received and one side of the first RAM 212 is opened occurs when the wireless communication unit 230 fails to receive some packets among packets that have been transmitted in the first unit of communication. Alternatively, a situation where the packets to be transferred next are not received and one side of the first RAM 212 is not opened (both sides are full) occurs when the wireless communication unit 230 fails to receive some packets among packets that have been transmitted in the first unit of communication, thereby requesting retransmission of the lost packets, and still fails to receive the retransmitted packets contained in packets that have been transmitted in the second unit of communication.

Upon determining that the one side of the first RAM 212 is opened (YES at Step S311), the retransmission requesting unit 252 of the sub CPU 211 sends a retransmission request containing the packet number of a packet that has not been received to a packet transmission source (Step S312).

Then, similar to the process performed at Steps S301 to S304, the process from detection of transfer complete of the packets to storing of information about the received packets is performed. Then, packets including a retransmitted packet in a unit of communication are received in response to the retransmission request. As a result, the both sides of the first RAM 212 are filled with the received packets.

Then, the sub CPU 211 determines whether the packets to be transferred next in the original order of transfer to the main system 100 are stored in the first RAM 212 by referring to the second RAM 213 (Step S305). Upon determining that all the packets to be transferred next are received due to reception of the retransmitted packet (YES at Step S305), the sub CPU 211 performs the process at Steps S306 to S310, S313, S314, and S316 to transfer the packets to the main memory 123 as described above, and process control ends.

Figure 9:
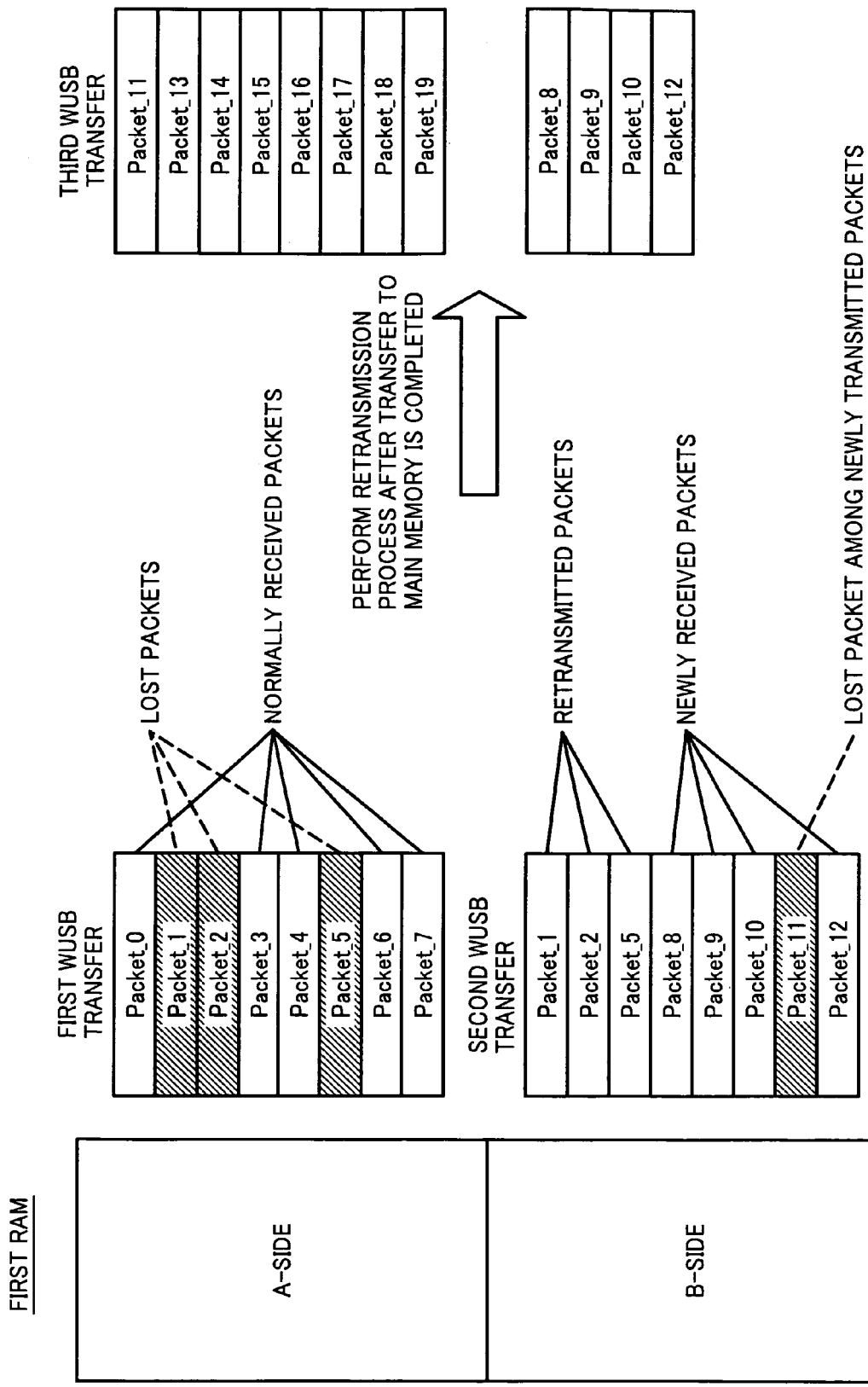
FIG. 9 is a schematic diagram of a configuration of the first RAM when all packets to be transferred next are received due to a retransmission request.

FIG. 9 is a schematic diagram of the configuration of the first RAM 212 when all packets to be transferred next are received due to a retransmission request. In the example shown in FIG. 9, Packet_1, Packet_2, and Packet_5 have not been received by the first packet transmission, and then they have been retransmitted together with Packet_8 and successive packets due to a retransmission request sent from the retransmission requesting unit 252. Accordingly, Packet_0 to Packet_7 are transferred from the sub system 200 to the main memory 123, and then the A-side of the first RAM 212 is opened. The wireless communication unit 230 subsequently receives packets of the same number as in one unit of communication and including Packet_11, which has not been received by the previous packet transmission, due to a retransmission request sent from the retransmission requesting unit 252. When all the packets are received, Packet_8 to Packet_15 are transferred in bulk to the main memory 123.

Returning to the explanation of FIGS. 4A and 4B, upon determining that the packets to be transferred next are not received even after reception of the retransmitted packet (NO at Step S305), the sub CPU 211 determines whether one side of the first RAM 212 is opened (Step S311). If retransmission has been performed due to the retransmission request, both sides of the first RAM 212 are filled with packets. Therefore, if retransmission has been performed, the sub CPU 211 determines that the one side of the first RAM 212 is not opened (NO at Step S311). In this case, the sub CPU 211 makes a setting for transferring a dummy (invalid) packet at Step S307 and performs the same process as performed at Steps S306 to S310, and S313.

In this manner, according to the embodiment, dummy (invalid) packet data of the same data size as that of a lost packet is generated based on the information about retransmitted packets and received from the wireless communication unit 230. Then, the dummy packet data is treated as a replacement of the lost packet contained in packets in one unit of communication, so that eight packets can be transferred to the main memory 123 in the original order of transfer. Then, the one side of the first RAM 212 is opened to make a free space. By putting the dummy packet data, eight packets can be transferred in bulk in the original order of transfer. Therefore, degradation of transfer efficiency can be prevented.

As described above, the packet information is transferred to the main CPU 121 due to the message interrupt from the sub CPU 211. At this state, however, the main CPU 121 may mistakenly determine that all real packets are received even when dummy packet data is contained. Therefore, it is necessary to notify the main CPU 121 that dummy packet data is contained in packets to be transferred, before actually transferring the packets. To address the above situation, a message containing information indicating that a lost packet is contained and the packet number of the lost packet is stored in the third RAM 214 to be accessed by the main CPU 121 and the sub CPU 211 for sharing transfer information. Accordingly, the main CPU 121 can be notified that the dummy packet data is contained. In other words, the main CPU 121 can obtain information about in what location of the main memory 123 and of what size dummy packet data is contained by reading the message stored in the third RAM 214.

The sub CPU 211 determines whether re-retransmission of a packet is necessary (Step S314). Upon determining that re-retransmission of a packet is necessary (YES at Step S314), the sub CPU 211 sends a request for re-retransmission of a packet to the transfer source (Step S315), and process control returns to Step S301. When the packet is successfully received due to re-retransmission, the sub CPU 211 determines that packets to be transferred next are received at Step S305, and process control continues until the end.

Figure 10:
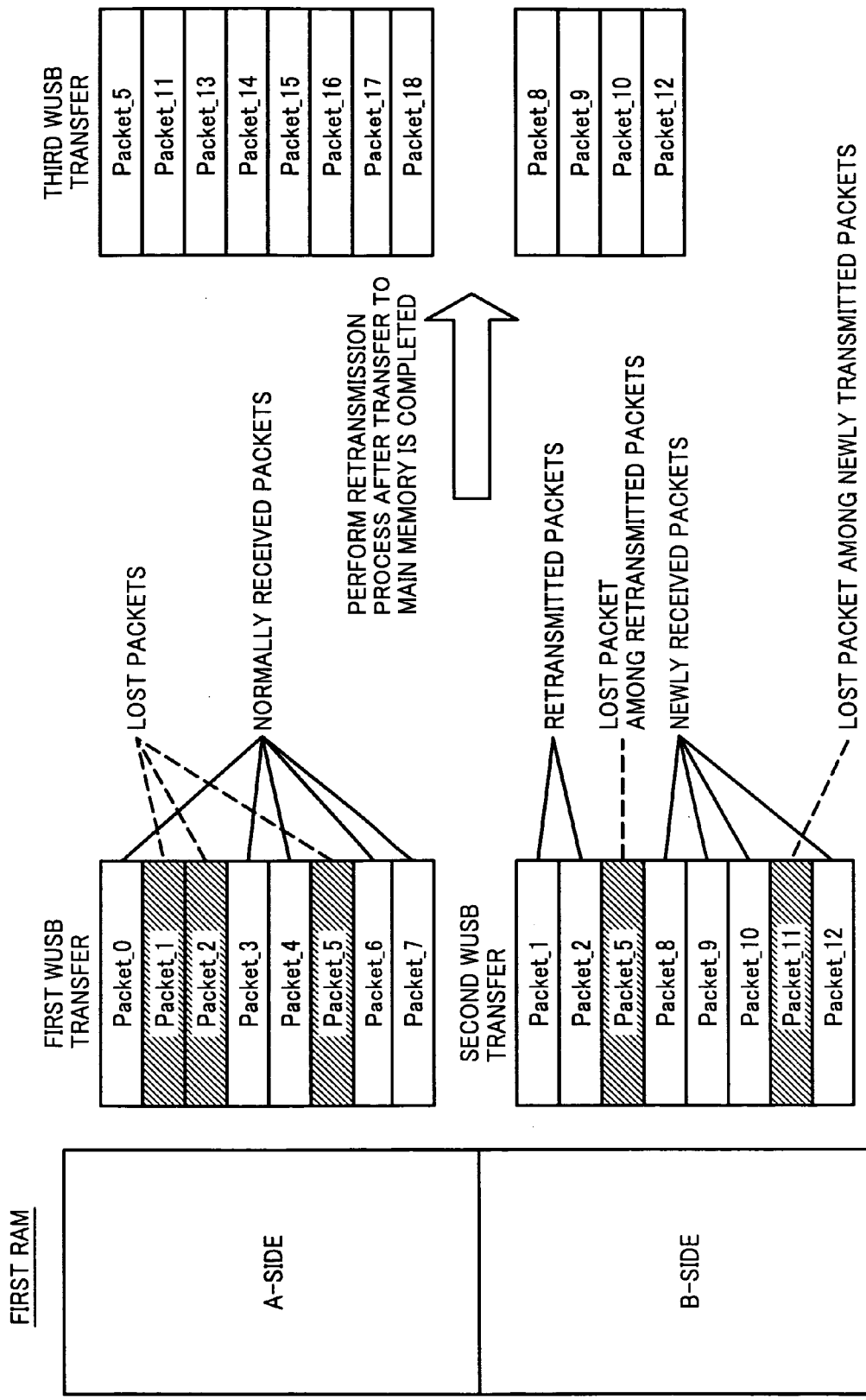
FIG. 10 is a schematic diagram of a configuration of the first RAM when Packet_5 is not received even after retransmission is performed due to a retransmission request.

FIG. 10 is a schematic diagram of a configuration of the first RAM 212 when Packet_5 is not received even after a retransmission is performed due to a retransmission request. In the example shown in FIG. 10, Packet_1, Packet_2, and Packet_5 have not been received by the first packet transmission, and a retransmission request is sent from the retransmission requesting unit 252. In the second packet transmission, Packet_1, Packet_2, Packet_8 and successive packets have been received except Packet_5 and Packet_11. Therefore, the sub system 200 puts a dummy packet as a replacement of Packet_5 contained in the packets in one unit of communication, and sends the packets to the main memory 123. Subsequently, the A-side of the first RAM 212 is opened, and the wireless communication unit 230 receives packets including Packet_5 and Packet_11 in a next unit of communication due to a retransmission request from the retransmission requesting unit 252. Consequently, the RxDMAC 216 transfers Packet_5 that is a re-retransmitted packet to the main memory 123, and then transfers eight packets from Packet_8 to Packet_15 in bulk to the main memory 123.

After the above process is completed, a notice indicating that the packets stored in the first RAM 212 are transferred to the main memory 123 is sent to the wireless communication unit 230. Upon receiving the notice, the wireless communication unit 230 notifies the packet transmission source that the wireless communication unit 230 can receive new packets.

Thus, a series of the processes for receiving the packets is completed. When packets to be transferred next are stored in the first RAM 212, the process is repeated from Step S301. On the other hand, when packets to be transferred next are not yet stored in the first RAM 212, the process is not started until new packets are transmitted.

As described above, the process for requesting retransmission of a packet that has not normally received is performed by the sub controller 210 arranged near the wireless communication unit 230 under a control by the sub CPU 211. Therefore, process efficiency on the entire system can be improved compared with a case when the main system 100 performs the retransmission process. Thus, loads on the main CPU 121 can be reduced.

After the retransmission request is issued, packets containing a retransmitted packet in a unit of communication are transmitted by the second packet transmission. The wireless communication unit 230 performs the process of receiving the retransmitted packet, and stores the normally-received packets in the first RAM 212. Consequently, the packets in a unit of communication can be transferred in bulk to the main system 100.

When the first RAM 212 has a memory area capable of storing therein at least the same number of packets as in one unit of communication, it is possible to perform the above described transfer operation with the above packet sorting.

However, if the first RAM 212 is configured to have the memory area of only the above size and when a retransmission request is issued, one packet transmission is performed only for retransmitting a lost packet, resulting in degradation of transfer efficiency. Considering the process for processing retransmitted packets as described with reference to FIG. 5, it is preferable to assure the memory area having at least the A-side and the B-side for storing therein the same number of packets as in two units of communication.

If the memory area capable of storing therein the same number of packets as in two units of communication is assured and reception operation and transfer operation are performed in the following procedures, it is possible to perform parallel transfer operation in response to a transfer request from external devices even when a retransmission request is issued at every transfer. To effectively perform the following procedures, a packet transfer speed for transferring packets from the first RAM 212 to the main memory 123 need to be equal to or faster than a transmission speed for receiving packets from external devices.

The process procedure of the parallel transfer operation is described below. The process from reception of packet transmission data from external devices to storing of the received packet data in the main memory 123 is the same as that described in the flowchart of FIGS. 4A and 4B.

Upon detecting a transfer complete interrupt from the main CPU 121, the sub CPU 211 sends a notice indicating that next packet transmission data can be received to the wireless communication unit 230. In other words, when packets are stored in the main memory 123, which means packet transfer is completed, the memory area for storing therein at least the same number of packets as in one unit of communication (the area corresponding to the A-side in the example shown in FIG. 5) is opened. Then, the sub CPU 211 sends information about free space of the first RAM 212 to the wireless communication unit 230.

The wireless communication unit 230 confirms that the memory area capable of storing therein the same number of packets as in one unit of communication is allocated, and then sends a notice indicating that the packets can be received to the packet transmission source.

Due to the following processes, a transfer request from external devices can be promptly processed even when the packets stored in the first RAM 212 are being transferred to the main memory 123.

As explained in the description about the transfer operation performed on packet data via the sub controller 210, in the system according to the embodiment, packets stored in the memory area of the first RAM 212 in an incorrect order are sorted into a correct order based on the setting in the register 241 in the first arbiter 217, and the sorted packets are stored in the main memory 123.

In the transfer control on packets, the register 241 in the first arbiter 217 is configured to have a burst length (a unit of communication) corresponding to eight packets as shown in FIG. 3. The transfer control for transferring packets stored in the first RAM 212 to the main memory 123 is performed with respect to each burst length (a unit of communication). Thus, a series of the processes from reception of packets to storing of the packets can be efficiently performed.

However, even when the register 241 in the first arbiter 217 is configured to have the burst length corresponding to eight packets as a unit of communication (a unit of transfer) as shown in FIG. 3, it is not always possible to receive the same number of packets to be stored in the main memory 123 as the burst length. For example, if the packets are stored in the memory area of the first RAM 212 as shown in FIG. 5, eight packets corresponding to the setting in the register 241 are transferred by the first transfer. In the second transfer for transferring the rest of packets, only five packets from Packet_8 to Packet_12 stored in the memory area (B-side) need to be transferred. However, unnecessary three packets need to be transferred because eight packets are bundled as a unit of transfer.

To solve the above disadvantage, according to the embodiment, the last-packet-data determination flag for identifying a last packet is set in the register 241 in the first arbiter 217. The last-packet-data determination flag is written as flag data in a predetermined area in the register 241 as shown in FIG. 3. Therefore, the last packet can be detected by the last-packet-data determination flag.

Accordingly, the first arbiter 217 performs the transfer control until the last packet detected by the flag data upon transferring packets to the main system 100. Therefore, it is possible to prevent unnecessary packets from being transferred.

With the last-packet-data determination flag, unnecessary packets are not transferred. Therefore, even when the packets less than eight are transferred, transfer can be finished by the necessary number of times, and successive packets can be transferred. Therefore, loads on the main CPU 121 can be reduced.

The sub CPU 211 makes the setting to the register 241 in the first arbiter 217 of the sub controller 210 as described above in the process at Step S307 of FIGS. 4A and 4B. To make the setting, the sub CPU 211 acquires control information that is used when the wireless communication unit 230 transfers normally-received packets to the first RAM 212, from the wireless communication unit 230, and manages the acquired control information. The control information acquired from the wireless communication unit 230 is the control information used for transferring packets that have subjected to a process whether the packets are normally received at the time of reception, to the first RAM 212.

The control information acquired by the sub CPU 211 contains a packet number, a data size, and an address of the first RAM 212 for each packet, and the contained information are used for setting the register 241 in the first arbiter 217. Upon setting the register 241, the sub CPU 211 determines to what packet the last-packet-data determination flag is set based on the packet number contained in the control information managed by itself for each packet, and sets the last-packet-data determination flag to the determined packet.

In this manner, the sub CPU 211 in the sub controller 210 acquires the control information of each of packets that have been normally received and stored in the first RAM 212, from the wireless communication unit 230, and uses the acquired control information for setting the register 241 in the first arbiter 217. As a result, packet transfer can be efficiently and assuredly performed.

Figure 11:
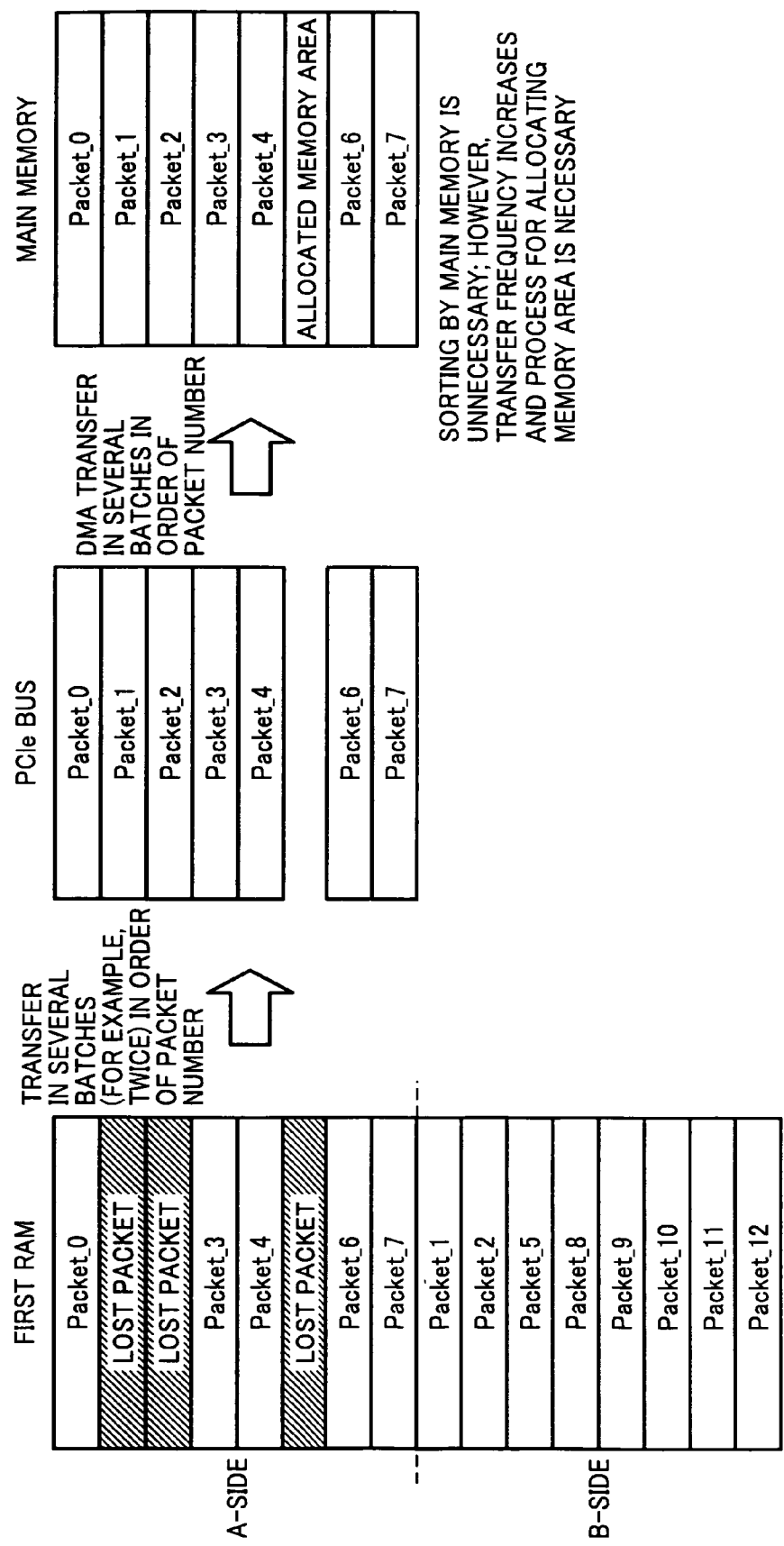
FIG. 11 is a schematic diagram for explaining how packets stored in the first RAM are transferred by using the conventional technique.

Operation of transferring packets stored in the first RAM 212 is described below. FIG. 11 is a schematic diagram for explaining a procedure of transferring packets stored in the first RAM 212 by using the conventional technology. It is assumed that packets are sorted by using the technique according to the embodiment, and Packet_5 that has not been received is processed by using the conventional technique. In this case, the sub system 200 transfers the packets twice such that packets preceding to Packet_5 are transferred first and packets subsequent to Packet_5 are transferred next. Accordingly, a space for storing therein Packet_5 can be allocated in the main memory 123. However, transfer efficiency is degraded because packet transfer needs to be performed twice.

Figure 12:
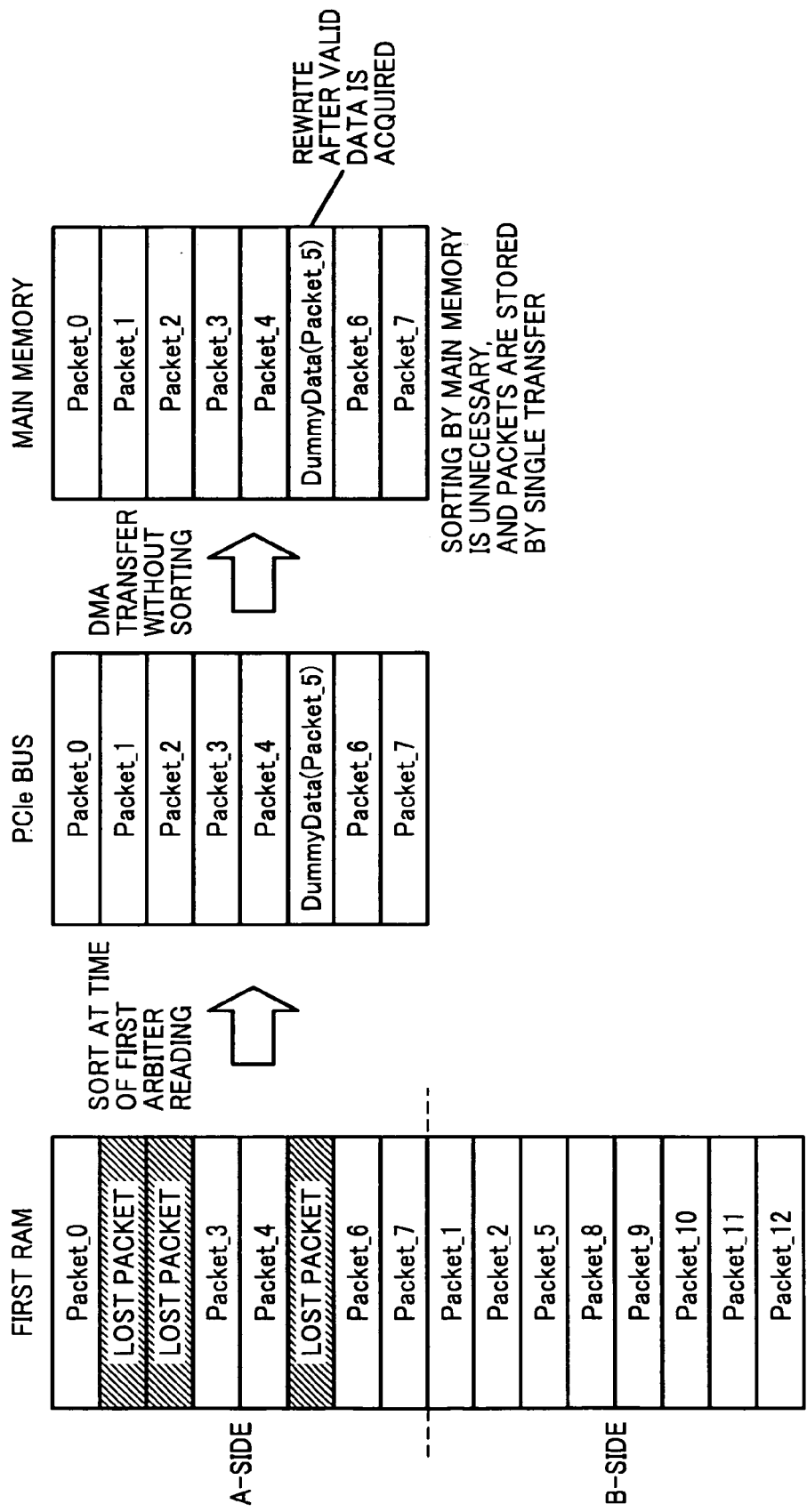
FIG. 12 is a schematic diagram for explaining an example how packets including a dummy packet are transferred according to the embodiment.

In the embodiment, a dummy packet is transferred instead of a lost packet. FIG. 12 is a schematic diagram for explaining an example how packets including a dummy packet are transferred according to the embodiment. In this example, packets are sorted by the first arbiter 217, and the sorted packets including a dummy packet are transferred and stored in the main memory 123 without sorting. Thereafter, if Packet_5 is transferred, the main memory 123 rewrites Packet_5 over the dummy packet. Thus, packet transfer can be efficiently performed and appropriate data can be stored in the main memory 123.

Figure 13:
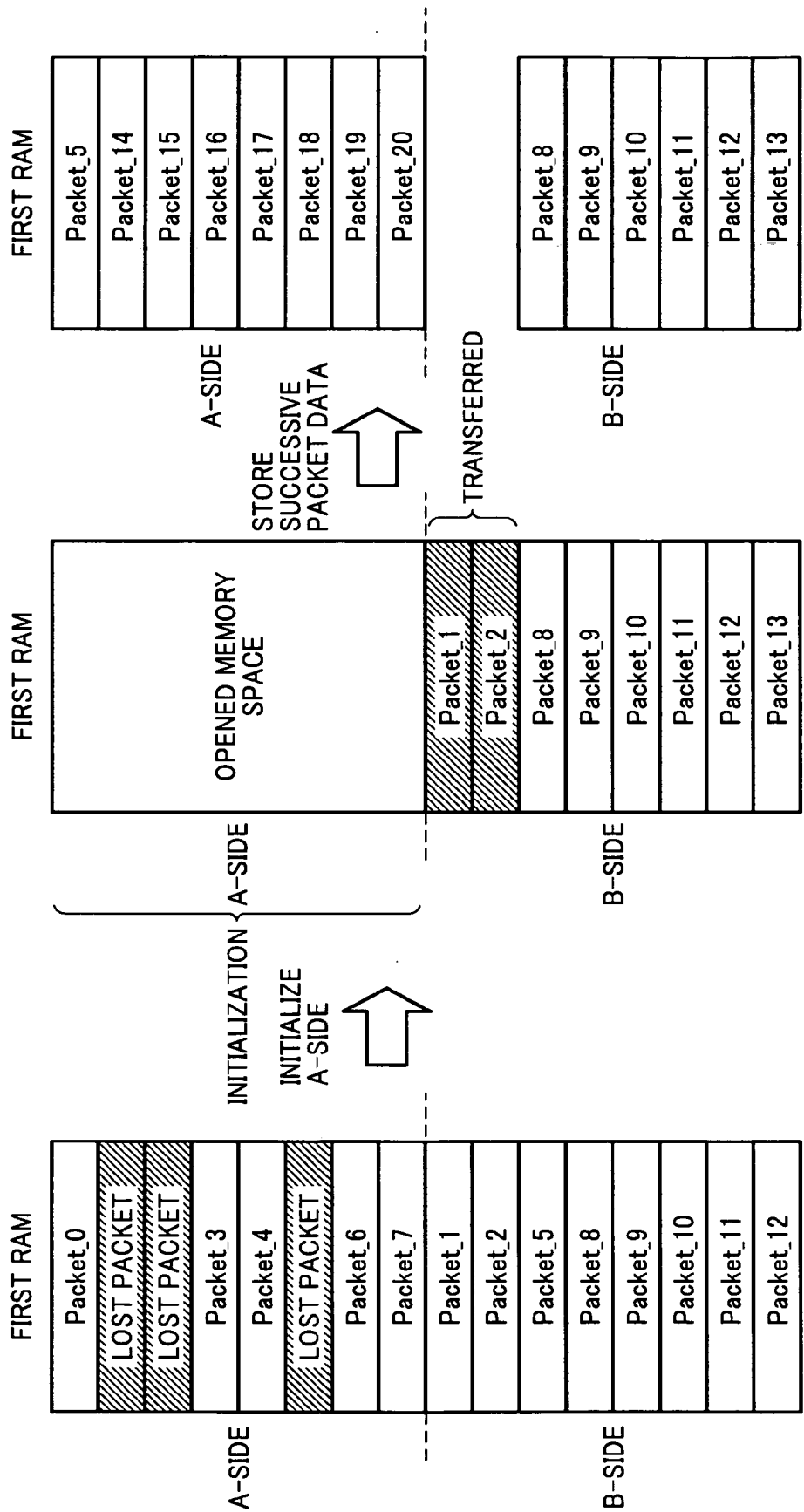
FIG. 13 is a schematic diagram for explaining how a memory area in the first RAM is allocated after a dummy packet is transferred.

Operation how a memory area in the first RAM 212 is allocated after a dummy packet is transferred is described below. FIG. 13 is a schematic diagram for explaining how a memory area in the first RAM 212 is allocated after a dummy packet is transferred. The memory area in the first RAM 212 depicted on the left side of FIG. 13 is the same as that shown in FIG. 12. After Packet_0 to Packet_7 including a dummy packet are transferred, the A-side of the first RAM 212 is opened, resulting in the state as shown in the middle of FIG. 13. It is assumed that Packet_1 and Packet_2 stored in the B-side have been transferred. Due to a retransmission request issued by the retransmission requesting unit 252, Packet_5 that has not been received as shown in FIG. 12 and Packet_14 and successive packets are stored in the A-side of the first RAM 212. Consequently, re-retransmission of Packet_5 can be performed.

Figure 14:
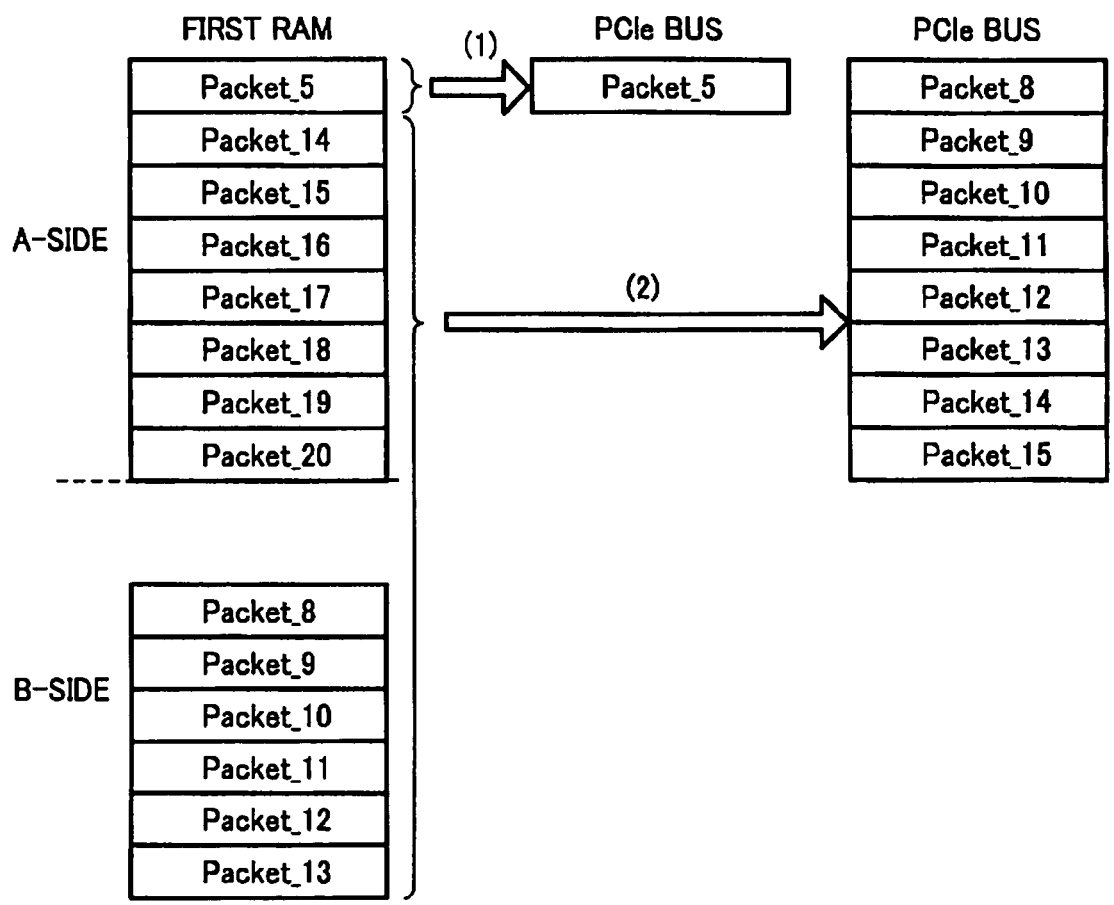
FIG. 14 is a schematic diagram for explaining a process on a re-retransmitted packet among packets stored in the first RAM.

FIG. 14 is a schematic diagram for explaining a process on a re-retransmitted packet among the packets stored in the first RAM 212. When the packets are stored in the first RAM 212 as shown in FIG. 14, the RxDMAC 216 of the sub system 200 transfers Packet_5 that is a re-retransmitted packet, and then transfers eight packets from Packet_8 to Packet_15 as a unit of transfer. The transferred packets are stored in the main memory 123 via a PCIe bus without sorting. Thus, the re-retransmitted packet can be properly stored in the main memory 123.

The processes for transferring received packet data according to the embodiment can be realized through execution of computer programs stored in known computer readable recording media such as CD-ROM.

According to the embodiment, the first arbiter 217 in the sub system 200 reads packets according to the setting made by the setting unit 251, so that sorting of the packets is not necessary. Therefore, loads on the main system 100 can be reduced. Furthermore, even when a packet loss occurs and thereby packet retransmission is performed, loads on the main system 100 can be maintained or even reduced by performing the above-described control. Moreover, when packet loss occurs even after retransmission of packets, packets in a unit of communication can be transferred by using a dummy packet. Therefore, it is not necessary to transfer packets in several batches. As a result, transfer efficiency can be improved.

According to an aspect of the present invention, packets are transferred to a control unit in a proper transfer order. Therefore, interrupt processing need not be performed at every transfer, and thereby, processing loads on the control unit can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a receiving unit that wirelessly receives a packet communication signal including a plurality of packets in units of communication;
   a requesting unit that, when the receiving unit fails to receive a packet included in the packet communication signal, issues a first retransmission request for retransmitting the packet;
   a storing unit that stores therein packets included in a first packet communication signal received before the first retransmission request is issued and packets included in a second packet communication signal received after the first retransmission request is issued including a retransmitted packet;
   a setting unit that sets a first order of transferring the packets stored in the storing unit to a control unit in an order of receiving the packets when the receiving unit receives the packets without a fail; and
   a transferring unit that transfers the packets stored in the storing unit to the control unit in the first order, wherein
   when the receiving unit fails to receive the retransmitted packet, the setting unit further sets a second order of transferring a dummy packet as a replacement of the retransmitted packet in an order of receiving packets having same content as that of the transmitted packet without a fail, and
   the transferring unit transfers the dummy packet to the control unit in the second order.

2. The information processing apparatus according to claim 1, wherein
   when the receiving unit fails to receive the retransmitted packet, the requesting unit further issues a second retransmission request for retransmitting the retransmitted packet, and
   the transferring unit transfers the retransmitted packet received by the receiving unit after the second retransmission request is issued to the control unit.

3. The information processing apparatus according to claim 1, further comprising a sub control unit that performs a control independently of the control unit, wherein
   the receiving unit, the requesting unit, the storing unit, the setting unit, and the transferring unit are provided under the control of the sub control unit.

4. The information processing apparatus according to claim 1, wherein the storing unit is capable of storing therein a number of packets equal to or less than two times a number of units of communication, a unit of communication including one or more packets, the number of packets in the unit of communication being based on a burst length.

5. The information processing apparatus according to claim 1, wherein the setting unit sets the first order based on header information contained in the packets received by the receiving unit.

6. An information processing method comprising:
   receiving wirelessly a packet communication signal including a plurality of packets in units of communication;
   issuing, when a reception of a packet included in the packet communication signal is failed, a first retransmission request for retransmitting the packet;
   storing packets included in a first packet communication signal received before the first retransmission request is issued and packets included in a second packet communication signal received after the first retransmission request is issued including a retransmitted packet in a storing unit;
   setting a first order of transferring the packets stored in the storing unit to a control unit in an order of receiving the packets when the packets are received without a fail; and
   transferring the packets stored in the storing unit to the control unit in the first order, wherein
   when the reception of the retransmitted packet is failed, the setting includes setting a second order of transferring a dummy packet as a replacement of the transmitted packet in an order of receiving packets having same content as that of the retransmitted packet without a fail, and
   the transferring includes transferring the dummy packet to the control unit in the second order.

7. The information processing method according to claim 6, wherein
   when a reception of the retransmitted packet is failed, the issuing includes issuing a second retransmission request for retransmitting the retransmitted packet, and
   the transferring further includes transferring the retransmitted packet received after the second retransmission request is issued to the control unit.

8. A computer program product comprising a non-transitory computer-usable medium having computer-readable program codes embodied in the medium that when executed cause a computer to execute:
   receiving wirelessly a packet communication signal including a plurality of packets in units of communication;

issuing, when a reception of a packet included in the packet communication signal is failed, a first retransmission request for retransmitting the packet;

storing packets included in a first packet communication signal received before the first retransmission request is issued and packets included in a second packet communication signal received after the first retransmission request is issued including a retransmitted packet in a storing unit;

setting a first order of transferring the packets stored in the storing unit to a control unit in an order of receiving the packets when the packets are received without a fail; and transferring the packets stored in the storing unit to the control unit in the first order, wherein when the reception of the retransmitted packet is failed, the setting includes setting a second order of transferring a dummy packet as a replacement of the transmitted packet in an order of receiving packets having same content as that of the retransmitted packet without a fail, and the transferring includes transferring the dummy packet to the control unit in the second order.

* * * * *